United States Patent
Kiyomoto et al.

(10) Patent No.: US 10,434,413 B2
(45) Date of Patent: Oct. 8, 2019

(54) GAME SYSTEM AND COMPUTER READABLE STORAGE DEVICE

(71) Applicant: KONAMI DIGITAL ENTERTAINMENT CO., LTD., Minato-ku, Tokyo (JP)

(72) Inventors: Masahiro Kiyomoto, Tokyo (JP); Koichi Tomita, Tokyo (JP); Toyokazu Sakai, Tokyo (JP); Shohei Sakuraba, Tokyo (JP); Erina Takeda, Tokyo (JP); Toru Miki, Tokyo (JP); Atsushi Usami, Tokyo (JP); Kanae Kokutani, Tokyo (JP); Naotaka Okamoto, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 37 days.

(21) Appl. No.: 15/841,010

(22) Filed: Dec. 13, 2017

(65) Prior Publication Data

US 2018/0104589 A1 Apr. 19, 2018

Related U.S. Application Data

(63) Continuation of application No. PCT/JP2016/066935, filed on Jun. 7, 2016.

(30) Foreign Application Priority Data

Jun. 15, 2015 (JP) ................................ 2015-120649

(51) Int. Cl.
*A63F 13/24* (2014.01)
*A63F 13/525* (2014.01)
(Continued)

(52) U.S. Cl.
CPC ............ *A63F 13/525* (2014.09); *A63F 13/24* (2014.09); *A63F 13/25* (2014.09); *A63F 13/44* (2014.09); *A63F 13/814* (2014.09); *A63F 13/53* (2014.09)

(58) Field of Classification Search
CPC ......... A63F 13/24; A63F 13/44; A63F 13/814
See application file for complete search history.

(56) References Cited

U.S. PATENT DOCUMENTS

| 8,003,872 | B2 * | 8/2011 | Lopiccolo | ............ G10H 1/342 463/43 |
| 2001/0012795 | A1 * | 8/2001 | Asami | ................. G10H 1/0008 463/1 |
| 2002/0004420 | A1 * | 1/2002 | Suga | ...................... A63F 13/10 463/7 |

(Continued)

FOREIGN PATENT DOCUMENTS

| JP | 2001-096061 A | 4/2001 |
| JP | 2001-212369 A | 8/2001 |

(Continued)

OTHER PUBLICATIONS

Notification of Reason for Refusal (KR Patent Application No. 10-2017-7035934); dated Oct. 16, 2018; Includes English Translation.

(Continued)

*Primary Examiner* — Omkar A Deodhar
*Assistant Examiner* — Shauna-Kay Hall
(74) *Attorney, Agent, or Firm* — Howard & Howard Attorneys PLLC

(57) ABSTRACT

The game system provides a music game which guides respective operation timings. Concretely, the game system presents on a game screen, a game area which includes: five lane images extending in parallel to each other such that a height difference is formed between an upper lane image group and a lower lane image group; and evaluation sign images and object images which are disposed along the (Continued)

respective lane images. The game system controls the display of the evaluation sign images and the object images such that the evaluation sign images are moved through the object images on the respective lane images at the respective operation timings to guide the respective operation timings through the coincidence of the evaluation sign images and the object images.

18 Claims, 16 Drawing Sheets

(51) Int. Cl.
    *A63F 13/814* (2014.01)
    *A63F 13/44* (2014.01)
    *A63F 13/25* (2014.01)
    *A63F 13/53* (2014.01)

(56) References Cited

U.S. PATENT DOCUMENTS

2012/0015729 A1* 1/2012 Takehiro ............... A63F 13/10
    463/35
2013/0053114 A1* 2/2013 Nishimura ............ A63F 13/814
    463/7

FOREIGN PATENT DOCUMENTS

JP     2007-111434 A     5/2007
JP     2013-022088 A     2/2013

OTHER PUBLICATIONS

AKB48 Tsuini Koshiki Otoge Demashita; Published: Aug. 8, 2016; 10 pages.
International Search Report (International Patent Application No. PCT/JP2016/066935) dated Aug. 23, 2016; Includes English Translation; 5 pages.
Written Opinion of the International Searching Authority (International Patent Application No. PCT/JP2016/066935); dated Aug. 23, 2016; Includes English Translation; 17 pages.
Notification of Reasons for Refusal (JP Patent Application No. 2015-120649); dated Jun. 15, 2016; Includes English Translation and Original; 13 pages.
Decision to Grant a Patent (JP Patent Application No. 2015-120649); dated Oct. 3, 2016; Includes English Translation and Original; 6 pages.
Grant of Patent (KR Patent Application No. 10-2017-7035934); dated Apr. 26, 2019; Includes English Translation; 4 pages.

* cited by examiner

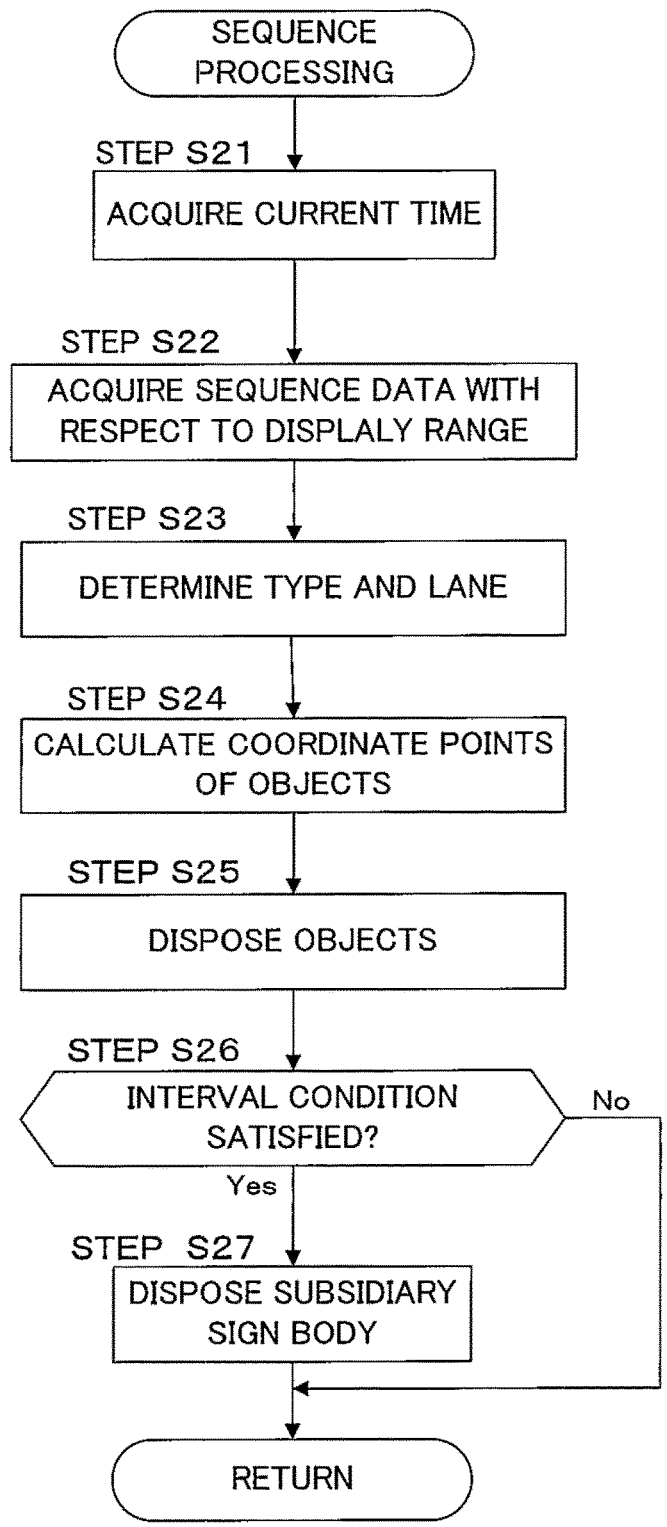

GAME SYSTEM AND COMPUTER READABLE STORAGE DEVICE

CROSS-REFERENCE TO RELATED APPLICATION

The present application is a continuation of PCT Patent Application No. PCT/JP2016/066935, filed Jun. 7, 2016, which claims priority to Japanese Patent Application No. 2015-120649, filed Jun. 15, 2015, the disclosures of which are hereby incorporated by reference in their entirety.

TECHNICAL FIELD

The present invention relates to a game system and the like which comprise a display device displaying a game screen including an indicative sign corresponding to an action timing when a play action should be executed and a reference sign corresponding to the current time, and provide a game where the action timing is guided through the game screen by making relative displacement between the indicative sign and the reference sign occur along a pathway according to elapsed time so that the position of the indicative sign and the position of the reference sign coincide with each other at the action timing.

BACKGROUND ART

There is known to be a game system which comprises a display device displaying a game screen including an indicative sign corresponding to an action timing when a play action should be executed and a reference sign corresponding to the current time, and provides a game where the action timing is guided via the game screen by making relative displacement between the indicative sign and the reference sign occur along a pathway according to elapsed time so that the position of the indicative sign and the position of the reference sign coincide with each other at the action timing. Further, there is known to be a game system, for example, where a note bar is employed as the indicative sign, a reference line is employed as the reference sign, a music game (a rhythm game) is employed as the game, movement of the note bar toward the reference line is employed as the relative displacement, and the operation timing is guided through the coincidence of the note bar and the reference line (for example, Patent Literature #1).

CITATION LIST

Patent Literature

PTL #1: JP-A-2001-96061.

SUMMARY OF INVENTION

Technical Problem

In the game disclosed in Patent Literature #1, each of three time axes extends vertically, the state of which looks like a case that a plane formed by the three time axes extending straightly is viewed from thereabove. In this case, since the note bar moves merely in a vertical direction along the time axis, user's habituation could be brought. On the other hand, in order to represent the stereoscopic effect in the game screen, sometimes used is such a game screen that a lane corresponding to each time axis extends from the deeper side to the nearer side, so as to show a state that a surface (a layer) formed by more than one time axes is viewed from the front side. Further, in this case, there is a case where each lane having a curved shape is used so that the movement direction of the note bar changes. However, even if the game screens above mentioned are used, each time axis is disposed merely on a single surface. Due to this, the line of sight of a user is concentrated on the same height, and thereby the stereoscopic effect with respect to the vertical (up-and-down) direction is not utilized sufficiently. That is, it is possible to further utilize the stereoscopic effect of the game screen.

In view of the foregoing status of the art, it is an object of the present invention to provide a game system and the like which are capable of vertically breaking up the line of sight of a user.

Solution to Problem

One aspect of the present invention provides a game system which comprises a computer having a display device displaying a game screen including an indicative sign corresponding to an action timing when a play action should be executed and a reference sign corresponding to current time, wherein the computer, by executing a computer program, provides a game where the action timing is guided through the game screen by making relative displacement between the indicative sign and the reference sign occur along a pathway according to elapsed time so that a position of the indicative sign and a position of the reference sign coincide with each other at the action timing, wherein the computer by executing the computer program functions as: an area presenting device which is configured to present a game area in the game screen, the game area including a plurality of lane images which extends in parallel to each other so that a height difference is formed between at least one part of the plurality of lane images; and two types sign images disposed along each of the plurality of lane images; and a sign controlling device which is configured to control display of the two types sign images so that, by making the relative displacement between the two types sign images occur along each of the lane images, the two types sing images function as the indicative sign and the reference sign respectively, and each of the lane images functions as the pathway.

Another aspect of the present invention provides a non-transitory computer readable storage medium storing the computer program according to the above game system.

BRIEF DESCRIPTION OF DRAWINGS

FIG. 16 is a diagram showing one example of a flowchart of sequence processing routine.

DESCRIPTION OF EMBODIMENTS

Figure 1:
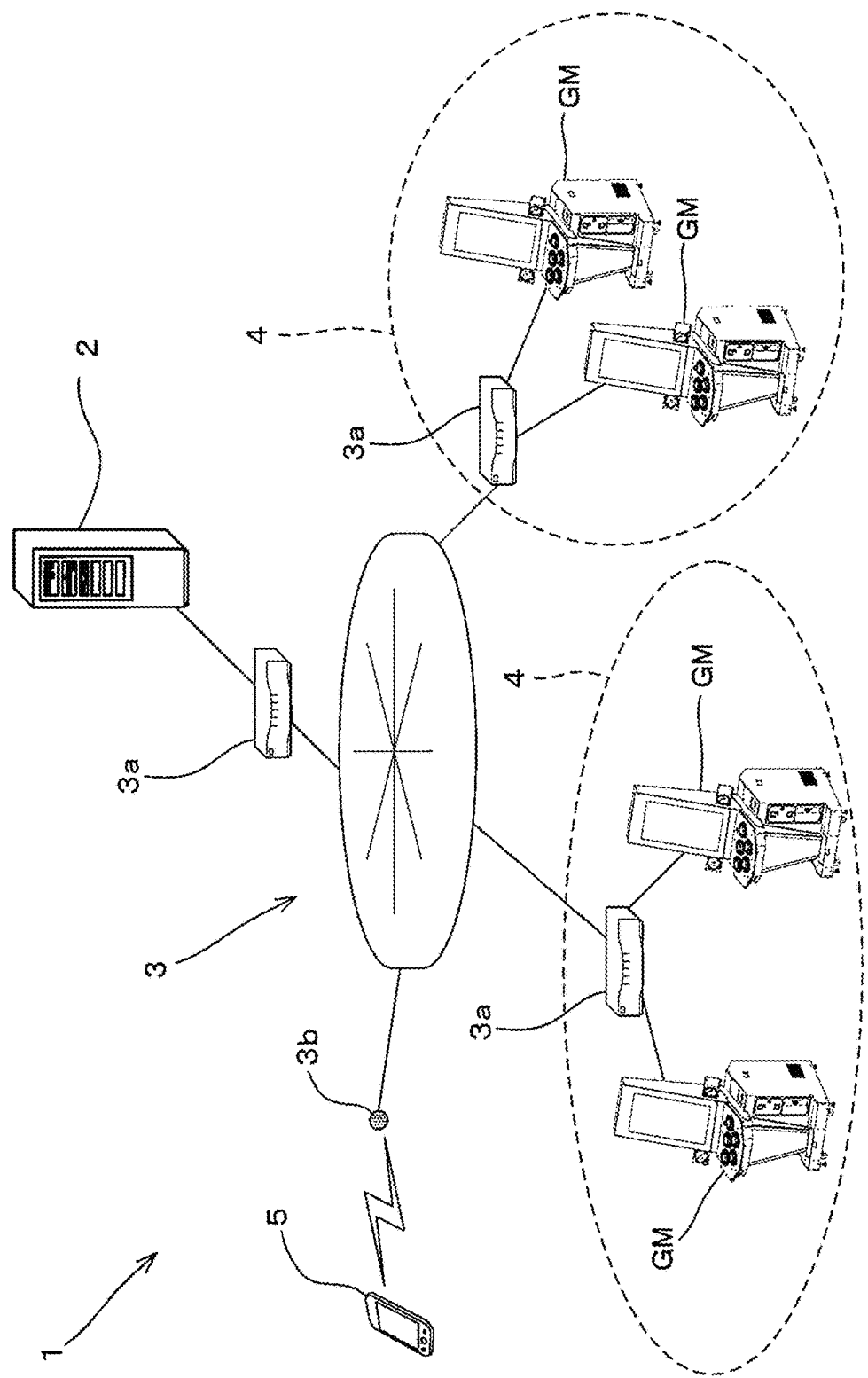
FIG. 1 is a diagram showing an outline of entire configuration of a game system according to one embodiment of the present invention.

The following describes a game system according to one embodiment of the present invention. FIG. 1 is a diagram showing an outline of entire configuration of a game system according to one embodiment of the present invention. As shown in FIG. 1, a game system 1 includes a center server 2 and a plurality of game machines GM. The game machines GM are connected with the center server 2 through a network 3. Each of the game machines GM has a structure as, for example, a game machine for business (commercial) use. The game machine for business use is a game machine which allows a user to play a game within a predetermined range for a fee or for free. As one example, each of the game machines GM provides a music game for a fee. Concretely, the game machine GM provides the music game within a certain range, for example, in exchange of consumption of a predetermined counter value, the certain range depending on the counter value. An appropriate number of game machines GM are installed for each commercial facility such as a store 4.

The center server 2 is not limited to one example that the center server 2 is established by a single physical device. For example, a single logical center server 2 may be established by a server group including a plurality of physical devices. Further, the center server 2 may be established logically by using cloud computing. Furthermore, the game machine GM may function as the center server 2.

To the center server 2, a user terminal 5 is connected through the network 3. The user terminal 5 is a kind of network terminal device which performs various functions by executing various kinds of software provided from the center server 2. In the example shown in FIG. 1, as one example of the user terminal 5, a portable phone (including a smart phone) is employed. In addition, as the user terminal 5, various types of network terminal devices which are available for a network connection and user's personal use may be employed, such as a personal computer, a portable game machine, a portable tablet terminal, or the like.

The network 3 is configured to realize network communication using, for example, the TCP/IP protocol. Typically, the network 3 is established by a combination of the internet as a WAN and the intranet as a LAN. In the example shown in FIG. 1, the center server 2 and the game machines GM are connected with the network 3 via routers 3a respectively, and the user terminal 5 is connected with the network 3 via an access point 3b.

The network 3 is not limited to an embodiment using the TCP/IP protocol. As the network 3, various types of network may be employed, the network using a wired communication network, a wireless communication network (including an infrared communication, a near field communication, and the like), or the like. Alternatively, the communication between the user terminal 5 and the game machine GM or the like may be realized, without using any communication networks (including wired and wireless), by using, for example, a code (for example, a two-dimensional code) generated in conformity with a predetermined standard so as to include various kinds of information. Accordingly, the term "network (or communication network)" includes an embodiment that information is communicated without using networks, such as a communication method using the above mentioned code.

The center server 2 provides various kinds of game machine service to the game machines GM or users thereof. As the game machine service, for example, a service for accepting identification information of users from the game machines GM and verifying the users may be provided. Further, a service for receiving from the game machines GM and storing game-play data of the users verified, or a service for providing to one of the game machines GM game-play data stored, may be also provided. Furthermore, the game machine service may include a service for serving and updating through the network 3 programs or data of the game machines GM, a matchmaking service for matching users who are going to play a common game through the network 3, and the like.

The center server 2 provides various kinds of Web service to a user of the user terminal 5 through the network 3. The Web service includes, for example, game information service for providing various kinds of information relating to the game provided by the game machine GM. Further, the Web service includes a delivery service for delivering (including updating data or the like) to each user terminal 5 various kinds of data or software. In addition, the Web service includes a community service for providing a communication site where outgoing of information, exchange of information, and sharing of information are available between users, a service for providing a user ID for identifying each user, and the like.

Figure 2:
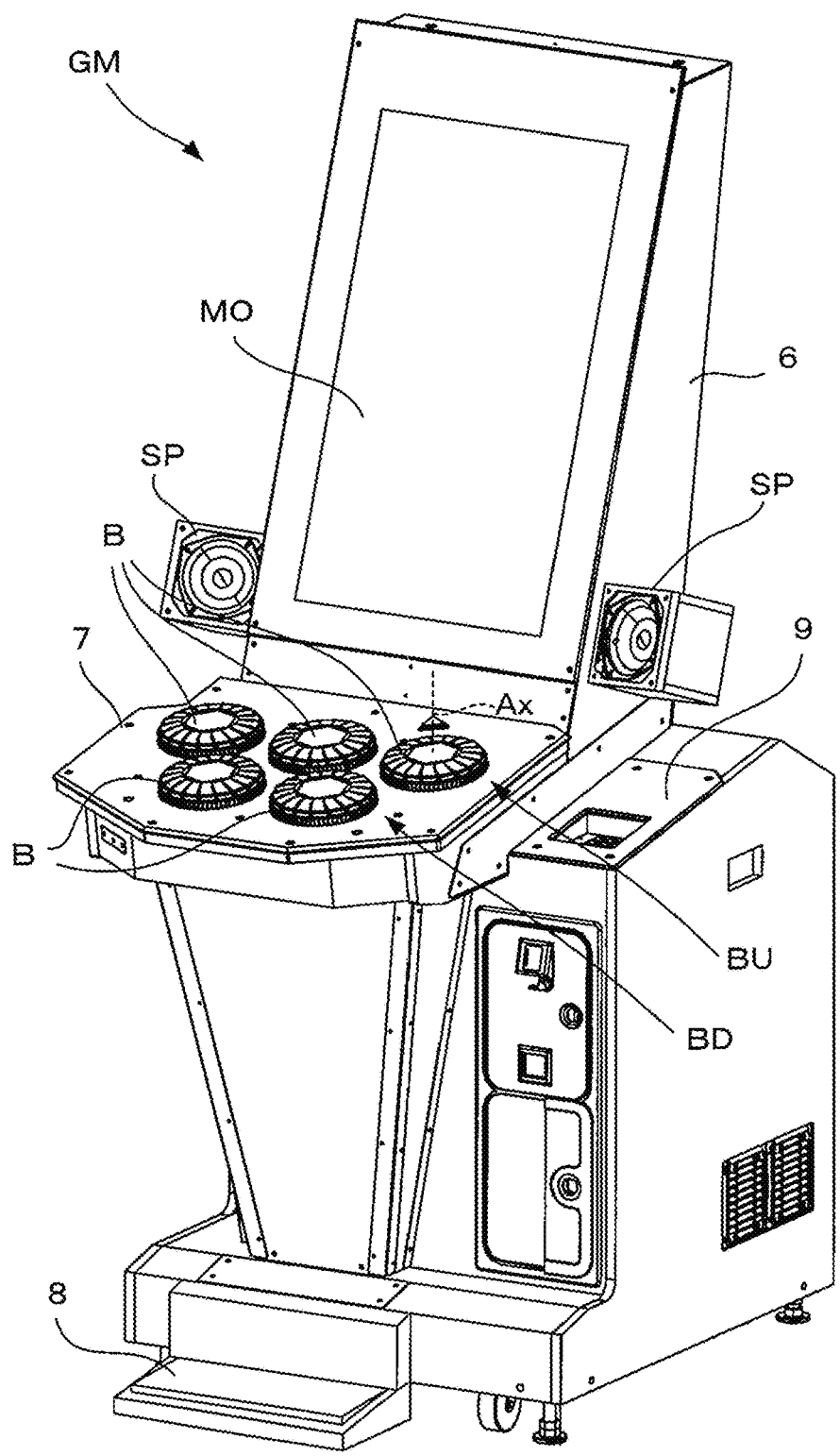
FIG. 2 is a diagram showing one example of the appearance of a game machine.

FIG. 2 is a diagram showing one example of the appearance of the game machine GM. As shown in FIG. 2, the game machine GM has a chassis 6. The chassis 6 has a structure as an upright chassis where a user plays a game in a standing position. A control panel 7 as an input device is provided at the front central portion of the chassis 6, and above the control panel 7 a monitor MO as a display device which is vertically long is provided. The control panel 7 is disposed so that the nearer side (the user side) thereof is somewhat lowered than a horizontal state.

The control panel 7 is provided with rotational buttons B as a plurality of (five pieces in the illustrated example) operation portions. Each of the rotational buttons B is formed in a cylindrical shape. Each rotational button B is used for a pressing operation for pressing the rotational button B downwardly along the axial line Ax of the cylinder. Further, each rotational button B has a structure which is rotatable around the axial line Ax to both right and left sides. Each rotational button B is also used for a rotation operation for rotating the rotational button B around the axial line Ax to both right and left sides. That is, both of the pressing operation and rotation operation are inputted through each rotational button B.

The five rotational buttons B are disposed so as to be divided into two rows that are front and back (upper and lower) rows viewed from the user facing the monitor MO of the chassis 6, and be horizontally arranged in each row, as one example. For example, the five rotational buttons B include, as a plurality of operation portion groups, an upper button group BU and a lower button group BD. The two rows are formed by these upper button group BU and lower button group BD. Concretely, the upper button group BU is located above the lower button group BD. The upper button group BU includes three of the rotational buttons B, and the three rotational buttons B are located above the lower button group BD, and horizontally arranged in a row at regular intervals. On the other hand, the lower button group BD includes two of the rotational buttons B, and the two rotational buttons B are horizontally arranged in a row at regular intervals, so that each of the two rotational buttons B is located at a space between the rotational buttons B of the upper button group BU. Accordingly, when the control panel 7 is viewed from thereabove, the five rotational buttons B form the two rows: a first row formed by the upper button group BU and a second row formed by the lower button group BD. And, in a case that the two rows are viewed from the user side, a height difference between the rows is generated with respect to the vertical direction along the slope. In other words, the five rotational buttons B are arranged in a zigzag manner so as to form the corners of a character "W".

A foot pedal 8 is provided at a bottom front portion of the chasses 6. The foot pedal 8 is an input device which is operated by a foot. For example, the foot pedal is used for input of a stepping operation by the user. In addition to the above, the game machine GM is provided with various types of equipments, such as a pair of speaker units SP for music reproduction, a console unit 9 for processing of payment of game-play fee (collection of counter value), verification of the user, and the like. Further, the game machine GM could be provided with various input devices and output devices which general game machines for business use comprise, such as a power switch and a power indicator. However, the illustrations thereof are omitted in FIG. 2.

Figure 3:
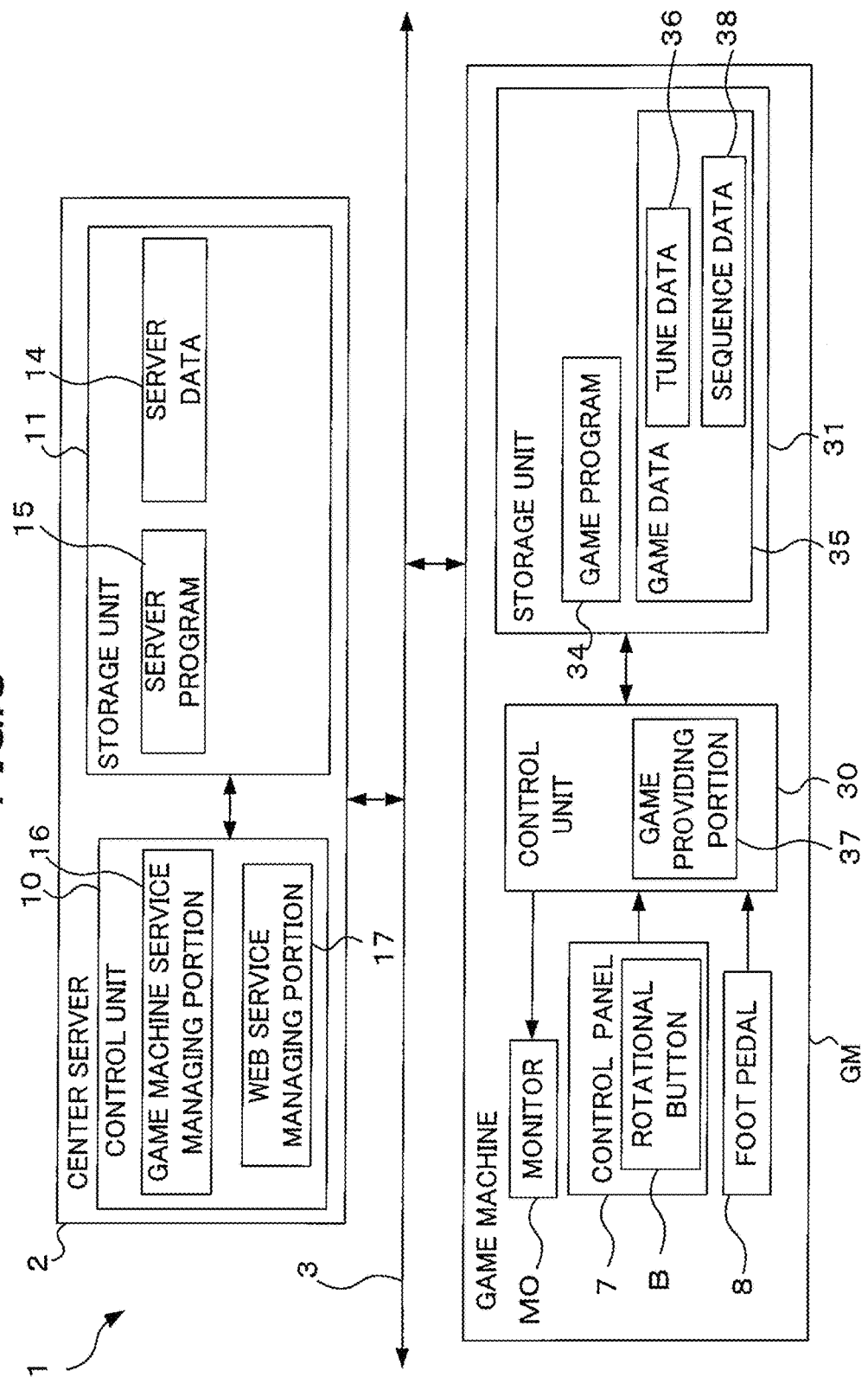
FIG. 3 is a diagram showing a structure of main portions of a control system of the game system.

Next, the following describes main portions of a control system of the game system 1 for realizing the music game. FIG. 3 is a diagram showing a structure of the main portions of the control system of the game system 1. As shown in FIG. 3, the center server 2 comprises a control unit 10 and a storage unit 11. The control unit 10 is configured as a computer unit where combined are a micro processor and various peripheral devices, such as internal memory devices (as one example, a ROM and a RAM) necessary for operations of the microprocessor. The control unit 10 could be connected with an input device such as a keyboard, an output device such as a monitor, and the like. However, the illustrations thereof are omitted.

The storage unit 11 is connected with the control unit 10. The storage unit 11 is configured as, for example, a mass storage medium such as a magnetic tape, so as to hold memory without power supply. In the storage unit 11, server data 14 and a server program 15 are stored. The server program 15 is a computer program necessary for the center server 2 which provides various kinds of service to the game machine GM and user terminal 5. The control unit 10 reads and executes the server program 15, and thereby a game machine service managing portion 16 and a Web service managing portion 17 are provided in the control unit 10.

The game machine service managing portion 16 executes processing for providing the above mentioned game machine service. The Web service managing portion 17 executes processing necessary for providing the above mentioned Web service. Each of the game machine service managing portion 16 and Web service managing portion 17 is a logical device which is realized by a combination of computer hardware and a computer program. In addition to the above, various logical devices could be provided in the control unit 10. However, the illustrations thereof are omitted.

The server data 14 is data which is referred along with the execution of the server program 15. For example, the server data 14 includes ID managing data and the game-play data above mentioned. The game-play data is data where information relating to a past play result of each user is described. The game-play data is used, for example, in order for a user to take over a game-play result (a past play result) until the last time for the following time, or to take over contents set uniquely for each user. The ID managing data is data for managing various kinds of IDs such as the user ID. In addition to the above, the server data 14 may include image data, tune data, sequence data, which are mentioned later, and the like.

On the other hand, the game machine GM is provided with a control unit 30 as a computer, a storage unit 31, the monitor MO, the control panel 7, and the foot panel 8. The storage unit 31, monitor MO, control panel 7, and foot panel 8 are connected with the control unit 30. The control unit 30 is configured as a computer unit where combined are a micro processor and various peripheral devices, such as an internal memory devices (as one example, a ROM and a RAM) necessary for operations of the microprocessor. In addition, the control unit 30 is connected with the console unit 9 including a card reader, a coin collection device, and the like. Some value recorded in an ID card or the like, or some coins or the like are collected as a predetermined counter value, for example. The control unit 30 is further connected with the mentioned speaker units SP, and additionally could be connected with various input devices and output devices similar to ones a publicly-known game machine has. However, the illustrations thereof are omitted.

The monitor MO is a well-known display device. On the monitor MO, a game screen and the like are displayed according to output signals from the control unit 30. The control panel 7 outputs various signals to the control unit 30. For example, the control panel 7 outputs to the control unit 30, a signal corresponding to an operation result of each rotational button B. Concretely, for example, the control panel 7 outputs to the control unit 30, signals corresponding to the pressing operation and rotation operation respectively for each rotational button B. Similarly, the foot pedal 8 outputs to the control unit 30, a signal corresponding to the stepping operation.

The storage unit 31 is configured as, for example, a magnetic recording medium, optical recording medium, flash SSD (Solid State Drive), or the like, so as to hold memory without power supply. In the storage unit 31, a game program 34 and game data 35 are stored. The game program 34 is a computer program necessary for the game machine GM which provides the music game. Along with execution of the game program 34, a game providing portion 37 is provided in the control unit 30. The game providing portion 37 executes various kinds of processing necessary for providing the music game. The game providing portion 37 is a logical device which is realized by a combination of computer hardware and a computer program. In addition to the game providing portion 37, various logical devices could be provided in the control unit 30. However, the illustrations thereof are omitted.

The game data 35 is data referred along with execution of the game program 34. The game data 35 includes, for example, tune data 36 and sequence data 38. The tune data 36 is data necessary for making the speaker units SP reproduce various types of sound such as a tune used in the music game. The sequence data 38 is data necessary for requesting appropriate play actions in the music game for a user. For example, in the sequence data 38, operation timings when the user should operate appropriately each rotational button B are described, and in the music game, an appropriate operation to each rotational button B or the like is requested at each operation timing. The details of the sequence data 38 will be described later.

Additionally, the game data 35 may include image data and the like, the image data being necessary for displaying game screens and the like. Further, the game data 35 may include, for example, the above mentioned ID managing data and game-play data. That is, the game data 35 could include various kinds of data necessary for providing the music game and the like. However, the illustrations thereof are omitted.

Figure 4:
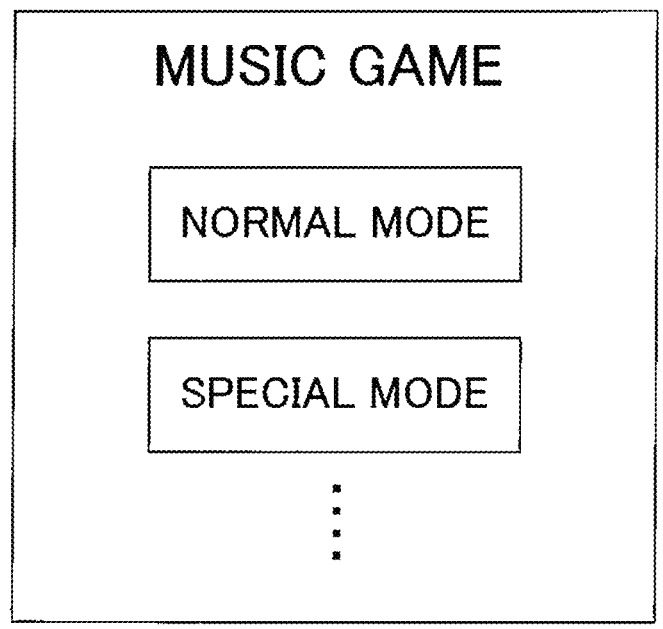
FIG. 4 is an explanation diagram for explaining one example of various kinds of modes provided by a music game.

Next, the following describes the game provided by the game machine GM. The game machine GM provides a music game as one example. The music game is a kind of timing game. Concretely, the music game is such a type of game that the action timing of each appropriate play action is evaluated. The action timing when the appropriate play action should be executed is, for example, presented through a game screen with a tune. In the music game, the timings conforming with the rhythm of the tune are used as the action timings. That is, the music game is such a type of game that each appropriate play action at each timing corresponding to the rhythm of the music is requested to the user, and the timing when the play action is actually executed is evaluated. As one example, the music game includes various kinds of modes. FIG. 4 is an explanation diagram for explaining one example of the various kinds of modes provided in the music game. As shown in FIG. 4, the music game includes a normal mode and a special mode, for example.

Figure 5:
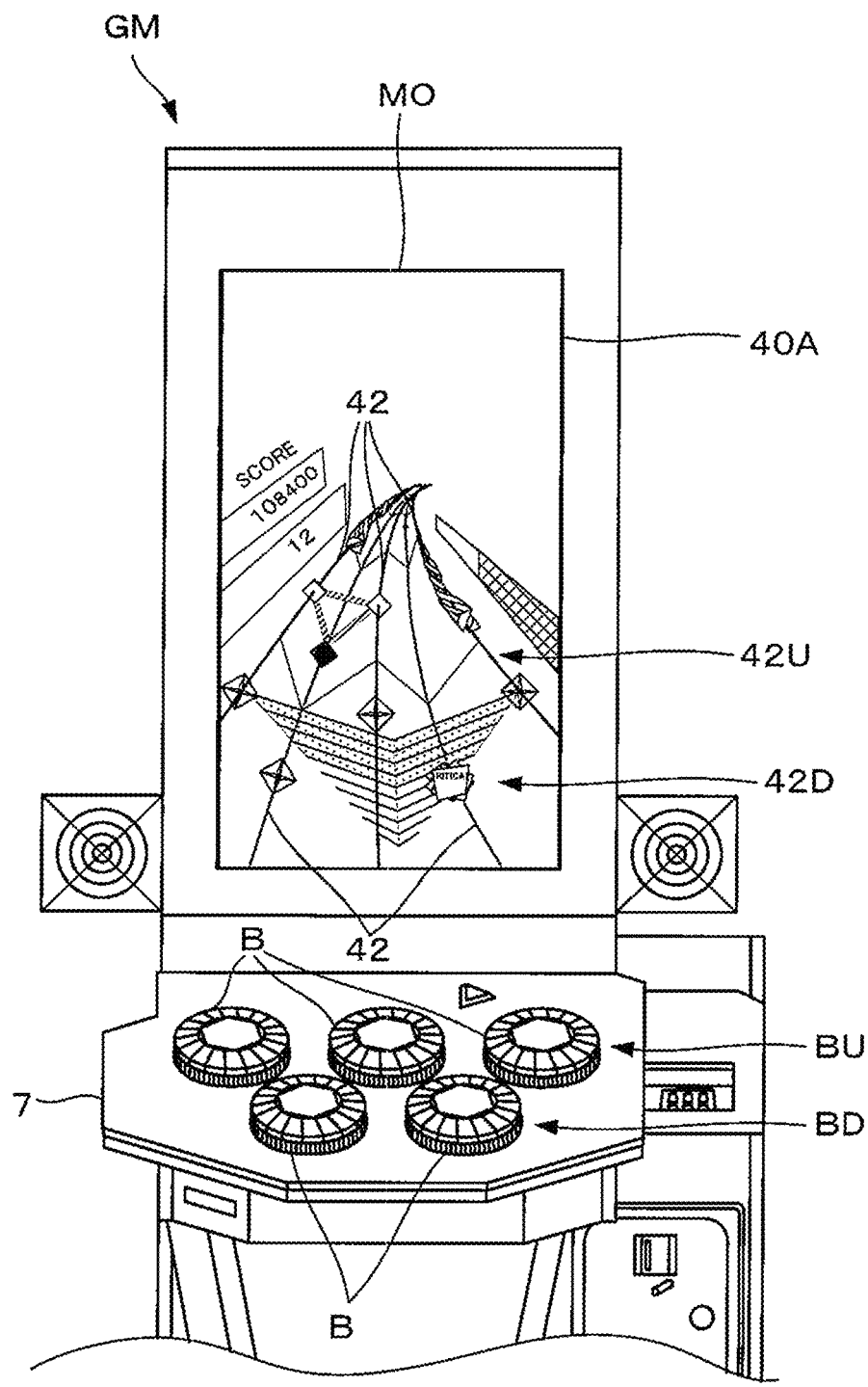
FIG. 5 is a diagram schematically showing a state that the game machine, where one example of a game screen of a normal mode is displayed, is viewed from a front side.
Figure 6:
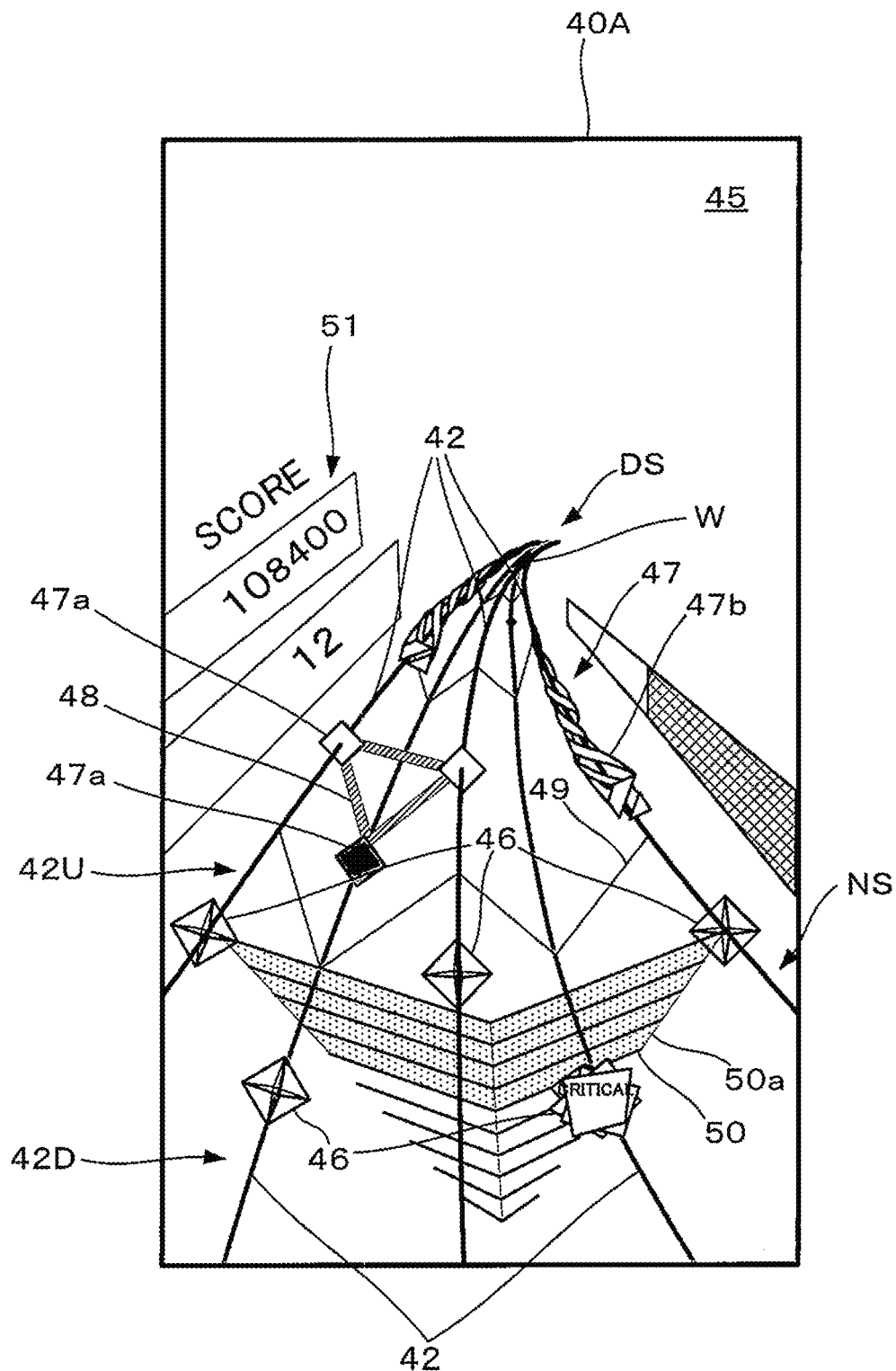
FIG. 6 is a diagram schematically showing one example of a normal game screen which is expanded.

Firstly the following describes the normal mode of the music game in reference to FIGS. 5 and 6. The normal mode is a mode of the music game provided in exchange of consumption of a predetermined counter value. FIG. 5 is a diagram schematically showing a state that the game machine GM where one example of a game screen of the normal mode is displayed is viewed from the front side thereof. As shown in FIG. 5, a normal game screen 40A is displayed on the monitor MO in the normal mode.

The normal game screen 40A is made as a two-dimensional image representing a virtual three-dimensional space. As one example, the virtual three-dimensional space is constructed so as to include five lanes. The five lanes extend in parallel to each other in the virtual three-dimensional space, as one example. Further, the five lanes are disposed in a layered manner in the virtual three-dimensional space so as to form two layers corresponding to the two rows of the five rotational buttons B. Concretely, the five lanes include an upper lane group and a lower lane group. The upper lane group is disposed above the lower lane group in the normal game screen 40A so as to correspond to the upper button group BU. The upper lane group includes three of the lanes, and the three lanes are horizontally arranged in a row at regular intervals above the lower lane group. On the other hand, the lower lane group includes two of the lanes so as to correspond to the lower button group BD, and the two lanes are horizontally arranged in a row at regular intervals so that each of the two lanes is located at each space between the lanes of the upper lane group. In this way, the five lanes form the two layers: a first layer formed by the upper lane group and a second layer formed by the lower lane group, so as to correspond to the two rows of the five rotational buttons B.

As one example, the normal game screen 40A is displayed so as to correspond to a two-dimensional image obtained when the virtual three-dimensional space mentioned above is shot by a virtual camera. Due to this, in the normal game screen 40A, lane images 42 are displayed as pathways, as one example. In this embodiment, there are five lane images 42 displayed. The five lane images 42 correspond to the five lanes respectively. The five lane images 42 include an upper lane image group 42U and a lower lane image group 42D as a plurality of lane image groups so as to correspond to the two layers formed by the upper lane group and lower lane group. The upper lane image group 42U as a first lane image group corresponds to the upper lane group, and includes three of the lane images 42 so as to form an upper one of the layers. The lower lane image group 42D as a second lane image group corresponds to the lower lane group, and includes two of the lane images 42 so as to form a lower one of the layers. By such upper lane image group 42U and lower lane image group 42D, two layers having a height difference are formed so as to correspond to the two rows of the five rotational buttons B. In other words, the five lane images 42 are also arranged in a zigzag manner so as to form a character "W". The lane images 42 of the upper lane image group 42U are correlated with the rotational buttons B of the upper button group BU respectively, and the lane images 42 of the lower lane image group 42D are correlated with the rotational buttons B of the lower button group BD respectively.

The following describes the normal game screen 40A in reference to FIG. 6. With respect to each lane of the virtual three-dimensional space, as one example, an evaluation sign is disposed for each lane. That is, in the virtual three-dimensional space, five evaluation signs corresponding to the five lanes respectively are disposed. Each of the evaluation signs functions as a reference of the current time in the virtual three-dimensional space. Each of the evaluation signs moves along the corresponding lane according to elapsed time. The virtual camera is disposed so as to include the evaluation signs each being located at a fixed position in a shooting range, and moves with the evaluation signs while keeping such a shooting range.

Further, to each lane, as one example, a plurality of types of objects are disposed at appropriate positions. Concretely, each type of object is disposed at an appropriate position on each lane along with the move of each evaluation sign, so as to appear on each lane at appropriate timing. Because of the move of each evaluation sign, each object coincides with each evaluation sign. That is, each evaluation sign moves according to elapsed time toward the deeper side of the lane along the lane so as to reach each object at the timing when an appropriate operation should be requested to a user. As a result, each lane functions as a time axis.

The normal game screen 40A is provided as a two-dimensional image corresponding to a shooting result obtained in a case that the virtual three-dimensional space including those evaluation signs and various types of objects has been shot by the virtual camera which moves with the evaluation signs. Accordingly, in the normal game screen 40A, images corresponding to the evaluation signs and various types of objects respectively are displayed.

FIG. 6 is a diagram schematically showing expanded one example of the normal game screen 40A. As shown in FIG. 6, the normal game screen 40A includes a game area 45. The five lane images 42 are displayed in the game area 45. On each lane image 42, an evaluation sign image 46 as a reference sign and sign image is disposed. Each of the evaluation sign image 46 corresponds to the evaluation sign of the virtual three-dimensional space. Further, on each lane image 42, an object image 47 as an indicative sign and sign image is disposed at an appropriate position. Each of the object images 47 corresponds to the object of the virtual three-dimensional space. By coincidence of the object image 47 and the evaluation sign image 46, the action timing when an appropriate play action should be executed is taught. Concretely, along with the move of each evaluation sign, each evaluation sign image 46 moves toward the deeper side of the corresponding lane image 42 with sequentially passing through the object image 47 located at an appropriate position. That is, each evaluation sign image 46 moves along the corresponding lane image 42 according to elapsed time so as to coincide with the position of the object image 47 at the timing when an appropriate operation should be requested to a user. In conformity with the coincidence of the position of the evaluation sign image 46 and the position of the object image 47, it is requested to a user to execute an appropriate play action.

The object image 47 includes a first operation object image 47a and a second operation object image 47b, which correspond to the plurality types of objects. The appropriate play action which is requested to a user is different depending on the type of object image 47. For example, in a case of the first operation object image 47a, the pressing operation for pressing the corresponding rotational button B is requested as the appropriate play action. Concretely, requested is the pressing operation to the rotational button B corresponding to the lane image 42 where the first operation object image 47a has been disposed. Similarly, in a case of the second operation object image 47b, the rotation operation to the rotational button B corresponding to the lane image 42 is requested as the appropriate play action. And then, with respect to each type of object image 47, the appropriate operation and the operation timing thereof are evaluated. This evaluation is executed in such a way that, for example, in a case that the appropriate operation has been executed, the evaluation is executed with respect to a gap time between the operation timing when the operation requested has been actually executed and the request timing (the coincident timing of the object image 47 and evaluation sign image 46). As the gap time is smaller, the evaluation becomes higher. On the other hand, in a case that the gap time is longer than a predetermined time, or the appropriate operation has not been executed, the operation is evaluated as "erroneous operation".

The upper lane image group 42U and the lower lane image group 42D are colored with different colors from each other. Concretely, for example, red is used for the upper lane image group 42U and blue is used for the lower lane image group 42D. Each object image 47 is colored according to the color of the lane image 42 where the object image 47 is located. That is, as one example, the object images 47 of the lane images 42 belonging to the upper lane image group 42U are colored with red, and the object images 47 of the lane images 42 belonging to the lower lane image group 42D are colored with blue. That is, each object image 47 is displayed so that it is distinguished depending on its color which group the object image 47 is disposed on, the upper lane image group 42U or the lower lane image group 42D.

In the game area 45, for example, in a case that the action timing when the appropriate play action should be executed satisfies an interval condition, a subsidiary sign is displayed. The interval condition is satisfied by, as one example, each of the action timings of different rotational buttons B from each other respectively, the action timings being included within a predetermined time interval. The subsidiary sign is used for indicating that the object images 47 correspond to the action timings thereof respectively. For example, as the subsidiary sign, a subsidiary line 48 connecting the object images 47 with each other is used. That is, as one example, in the game area 45, the object images 47 on different lanes 62 from each other respectively are displayed so as to be connected with each other by the subsidiary lines 48, the object images 47 corresponding to the action timings which are within the predetermined time interval. Further, as one example, the subsidiary line 48 may be used for connection of the object images 47, in a case that the same timing is employed as "the predetermined time interval", that is, in a case that the action timings when appropriate play actions should be executed are coincident with each other, each of the appropriate play actions corresponding to each rotational button B different from each other. The detail will be described later. The predetermined time interval is not limited to the same timing, that is, to be zero. The same timing is not necessary, and the predetermined time interval may be set to, for example, an appropriate time interval which could make various kinds of influence occur on displaying, such as a kind of parallax, because of a short time interval. Further, the subsidiary sign is not limited to the subsidiary line 48. As the subsidiary sign, various types of additional display, such as a display of an arrow indicating each object image 47, may be employed. Or, a displayed state of each object image 47 including its shape, color, or the like, may be employed as the subsidiary sign indicating the predetermined time interval. That is, to each of the object images 47 included in the predetermined time interval, various types of common display embodiments, such as a special shape, a special color, or flashing display, may be applied. That is, such displayed states of the object image 47 itself may function as the subsidiary sign.

Similarly, in the game area 45, an interval sign 49 for indicating elapsed time is displayed. For example, the interval sign 49 is displayed so as to indicate elapsed time of each lane image 42 which functions as the time axis. The elapsed time may be displayed for each predetermined interval. Similarly, as the predetermined interval, a bar of a tune which is used for the music game may be employed. That is, as one example, in the game area 45, the interval sign 49 sectioning elapsed time of the tune per bar is disposed so as to indicate a position corresponding to each bar on each lane image 42. By using the interval sign 49 as a marker, the user can grasp intuitively the action timing of each operation.

Further, in the game area 45, for example, a special mode gauge 50 is displayed. The special mode gauge 50 is a gauge for measuring an amount of mode change value 50a. The mode change value 50a is used for, as one example, determining whether the special mode should be provided or not. Concretely, for example, in a case that the mode change value 50a exceeds a predetermined amount (for example, a case that the mode change value 50a reaches the maximum amount corresponding to the maximum value of the special mode gauge 50), a right (an entitlement) for playing the special mode is given. The mode change value 50a increases based on, for example, an evaluation result corresponding to each object image 47. Concrete speaking, for example, the mode change value 50a increases more largely, as the evaluation result is higher, and on the other hand, in a case of an erroneous operation, the mode change value 50a does not increase. The increase and decrease of the mode change value 50a may be represented with various states. For example, the mode change value 50a may increase uniformly regardless of whether the evaluation result is high or low. On the other hand, the mode change value 50a may decrease in a case of an erroneous operation. Further, the mode change value 50a may increase along with elapsed time, and may increase or decrease in relation to use of items or the like. Furthermore, the mode change value 50a may increase according to payment of a predetermined counter value.

In the example shown in FIG. 6, the normal game screen 40A corresponds to a two-dimensional image where each lane located so as to extend in the virtual three-dimensional space from the upper side to the lower side thereof is shot. In the two-dimensional space, each lane is shot so that each lane image 42 extends with respect to the depth direction from the deeper side DS (the opposite side of the evaluation sign image 46) to the nearer side NS (the evaluation sign image 46 side), that is, along with the move of the evaluation sign image 46, the object image 47 gradually nears from the deeper side to the nearer side (such visual representation is displayed). As a result, in relation to perspective representation, the parallax (with respect to the vertical direction) occurs between the upper lane image group 42U and the lower lane image group 42D. Each lane image 42 is formed as a curved line having a flexion portion W as a change portion which makes a traveling direction of the object image 47 change. Also at the flexion portion W, the parallax (with respect to the horizontal direction) occurs as with the vertical direction. Due to this, the subsidiary lines 48 are disposed for three object images 47 (located at the nearest positions on the left three line images 42 respectively) corresponding to the same action timing.

Concretely, in the game area 45, in a visual manner, the evaluation sign images 46 look like each evaluation sign image 46 on the lower lane image group 42D is located at nearer position than each evaluation sign image 46 on the upper lane image group 42U due to the effect of the parallax with respect to the vertical direction. On the other hand, the evaluation signs correspond to the same current time. Accordingly, in a case that each lane is regarded as a time axis, the evaluation signs should be located at the same positions on the corresponding lanes respectively. That is, the positions which should indicate the same current time are displayed so that the positions in the upper lane image group 42U are deviated from the positions in the lower lane image group 42D, due to the parallax. Also with respect to the horizontal direction, the positions are displayed in a similar way. Concretely, as the lane mage 42 is located further outward (for example, at the left end or at the right end), the lane image 42 corresponds to the lane located further away from the virtual camera. Due to this, the parallax could occur also with respect to the horizontal direction. Especially, in a case that the evaluation sign image 46 is located at the flexion portion W by the move of the evaluation sign image 46, the parallax becomes more noticeable. Due to this, the same action timing is employed as one example of the predetermined time interval, and the three object images 47 corresponding to such evaluation sign images 46 are connected with each other with three subsidiary lines 48, each of the three object images 47 being provided on a different lane image 42 from each other. The object images 47 are disposed on the lane images 42 respectively, the lane images 42 being deviated from each other with respect to the vertical direction or the horizontal direction. Due to this, the three subsidiary lines 48 are disposed so as to form a triangle between the three object images 47. If the object images 47 corresponding to the same action timing are two, the two object images 47 are connected with each other by one subsidiary line 48.

Further, in the example shown in FIG. 6, the special mode gauge 50 is formed in an inverted pyramid shape looking like a large arrow indicating the nearer side. The special mode gauge 50 has 10 scale marks, and the mode change value 50a (shown as a dot pattern area in FIG. 6) has been accumulated until the fourth of the 10 scale marks. Similarly, the second operation object image 47b is formed so as to extend along the corresponding lane image 42. In this case, as the appropriate play action, it is requested to a user to start the rotation operation in conformity with the coincidence of the tip of the second operation object image 47b and the evaluation sign image 46, and then continue the rotation operation until the evaluation sign image 46 passes over the end of the second operation object image 47b.

Similarly, in the example shown in FIG. 6, with respect to the second right lane image 42, the characters "CRITICAL" and visual representation therefor are added at the position of the evaluation sign image 46. The characters and effect are displayed, in a case that the appropriate play action has been executed with respect to the object image 47 of the lane image 42. In a case of the second operation object image 47b, the characters and effect are displayed continuously while the appropriate rotation operation being executed. As the interval sign 49, a connection line is employed, the connection line being disposed so as to connect the lane images 42 sequentially with respect to the horizontal direction. As a result, the interval sign 49 is displayed so as to form a character "W". The interval sign 49 is not limited to such a connection line. As the interval sign 49, various types of images connecting the lane images 42 may be employed. On the other hand, the interval sign 49 is not limited to a state connecting the lane images 42. For example, various types of additional display being displayed for each lane image 42, such as an arrow indicating a position on the corresponding lane image 42, may be employed as the interval sign 49. Alternatively, a displayed state of each lane image 42 itself, such as the color, or the shape, may be changed for each predetermined interval. That is, such a displayed state of each lane image 42 may function as the interval sign 49.

In the example shown in FIG. 6, on the left side of the game area 45 and above the lane mages 42, a score display field 51 is provided. In the score display field 51, for example, an accumulated score from start of the game (for example, "108400"), a score obtained at the current time (for example, "12"), and the like are displayed. As one example, in the normal mode, through such a normal game screen 40A, the music game is provided.

The following describes the special mode of the music game in reference to FIGS. 7 to 13. The special mode is a mode that is provided in a case that a special condition is satisfied in the normal mode. As one example, the special condition is satisfied, in a case that the operation for stepping on the foot pedal 8 has been executed under a situation that the right for playing the special mode has been given. That is, as one example, in a case that the foot pedal 8 is operated after the mode change value 50a has exceeded the predetermined amount, the special condition is satisfied. Then, in the special mode, as one example, a two-dimensional image obtained when the virtual three-dimensional space is shot under shooting condition different from that in the normal mode, is used as a game screen.

Further, as one example, during the special mode, the amount of the mode change value 50a may decrease gradually according to the elapsed time. And then, the special mode may be continued until the mode change value 50a is fully consumed. On the other hand, along with the operation for stepping on the foot pedal 8 in the special mode, the special mode ends, and along with the end, it may stop to decrease the amount of the mode change value 50a. Accordingly, the special mode may be started based on an operation executed by a user after the right for playing the special mode has been given to the user, and may be stopped based on full consumption of the mode change value 50a or an operation executed by the user before the full consumption.

Figure 7:
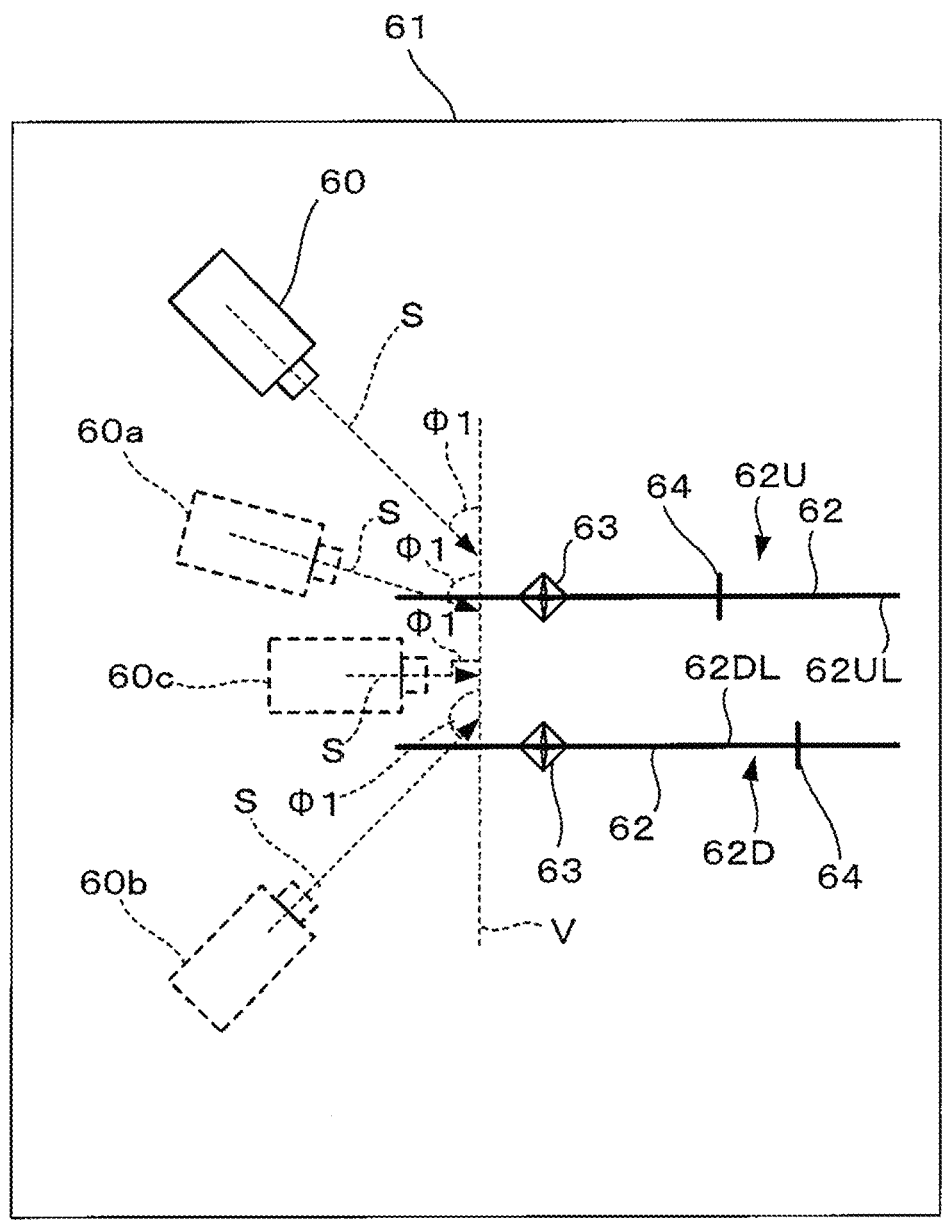
FIG. 7 is an explanation diagram for explaining change of shooting condition with respect to a vertical direction.

FIG. 7 is an explanation diagram for explaining one example of change of the shooting condition between the normal mode and the special mode under a situation that the virtual three-dimensional space corresponding to the game area 45 is viewed from the side. More concretely, the example shown in FIG. 7 is an explanation diagram for explaining the change of shooting condition with respect to the vertical direction. As shown in FIG. 7, the virtual three-dimensional space 61 includes the lanes 62, and the evaluation signs 63 and objects 64 as two types of signs. The lanes 62 are divided into the upper lane group 62U and the lower lane group 62D. The lanes 62 belonging to the upper lane group 62U are located at the same height when being viewed from the side, so as to from a surface (a layer). Similarly, the lanes 62 belonging to the lower lane group 62D are also located at the same height when being viewed from the side, so as to from a surface. As a result, in the virtual three-dimensional space 61, an upper layer 62UL corresponding to the surface where the upper lane group 62U is located and a lower layer 62UD corresponding to the surface where the down lane group 62D is located are formed virtually. Then, the two-dimensional image corresponding to a shooting result obtained when the above lanes 62 forming layers 62UL and 62UD are shot by the virtual camera is used as the game area 45. Due to this, similar layers are also formed with respect to the lane images 42.

Concretely, in the normal mode, the virtual camera 60 is disposed above the lanes 62 in the virtual three-dimensional space 61. And, the virtual camera 60 is located at the forward side with respect to the time axial direction (a direction opposite of the travelling direction of the evaluation signs 63). Then, the shooting direction S faces downward to shoot each lane 62, and the evaluation sign 63 and object 64 disposed along each lane 62 from a diagonally forward upside. As a result, in the game area 45, each of the lane images 42 is arranged so as to extend from the deeper side (the right end side of the lane 62) toward the nearer side (the left end side of the lane 62), so as to correspond to the two-dimensional image of the shooting result.

On the other hand, in the special mode, as one example, the shooting condition such as the shooting position (the location) of the virtual camera 60, the shooting angle, and the field angle can be changed. In the example shown in FIG. 7, one example after change with respect to the position of the virtual camera 60 and the shooting angle is shown by a first dash line 60a though a third dash line 60c. That is, in the special mode, as one example, as shown by the first dash line 60a though the third dash line 60c, the shooting condition of the virtual camera 60 can be changed. Concretely, for example, at the position indicated by the first dash line 60a, the position of the virtual camera 60 is lowered and more nears the lanes 62 in comparison with the position in the normal mode. Along with the downward move, the shooting direction S nears the direction where the lanes 62 extend so that the lanes 62 are included in the shooting range, and thereby the shooting angle is made somewhat moderate. For example, when a vertical plane V is set as a criterion, the angle φ1 between the shooting direction S and the vertical plane V is a sharp angle in the normal mode. On the other hand, in a case of the virtual camera 60 located at the first dash line 60a, the angle φ1 becomes blunt to near 90 degree.

At the position indicated by the second dash line 60b, the position of the virtual camera 60 is lower than the position of the first dash line 60a, and also lower than the lanes 62. Then, the shooting direction faces obliquely upward to shoot from a diagonally lower side the lanes 62 existing above. As a result, the angle φ1 between the shooting direction S and the vertical plane V becomes blunter than that of the first dash line 60a to form an obtuse angle exceeding 90-degree.

Further, the position of the vertical camera 60 is not limited to the outside of the lanes 62. For example, in a case of the position indicated by the third dash line 60c, the virtual camera 60 is located between the upper lane group 62U and the lower lane group 62D, that is, located between the two layers 62UL and 62 DL. Further, the shooting direction S may, as one example, coincide with the direction where the lanes 62 extend. That is, the virtual camera 60 is located so that the angle φ1 between the shooting direction S and the vertical plan V forms 90-degree. Then, the virtual camera 60 shoots the lanes 62 and the like from the position between the upper lane group 62U and the lower lane group 62D.

Figure 8:
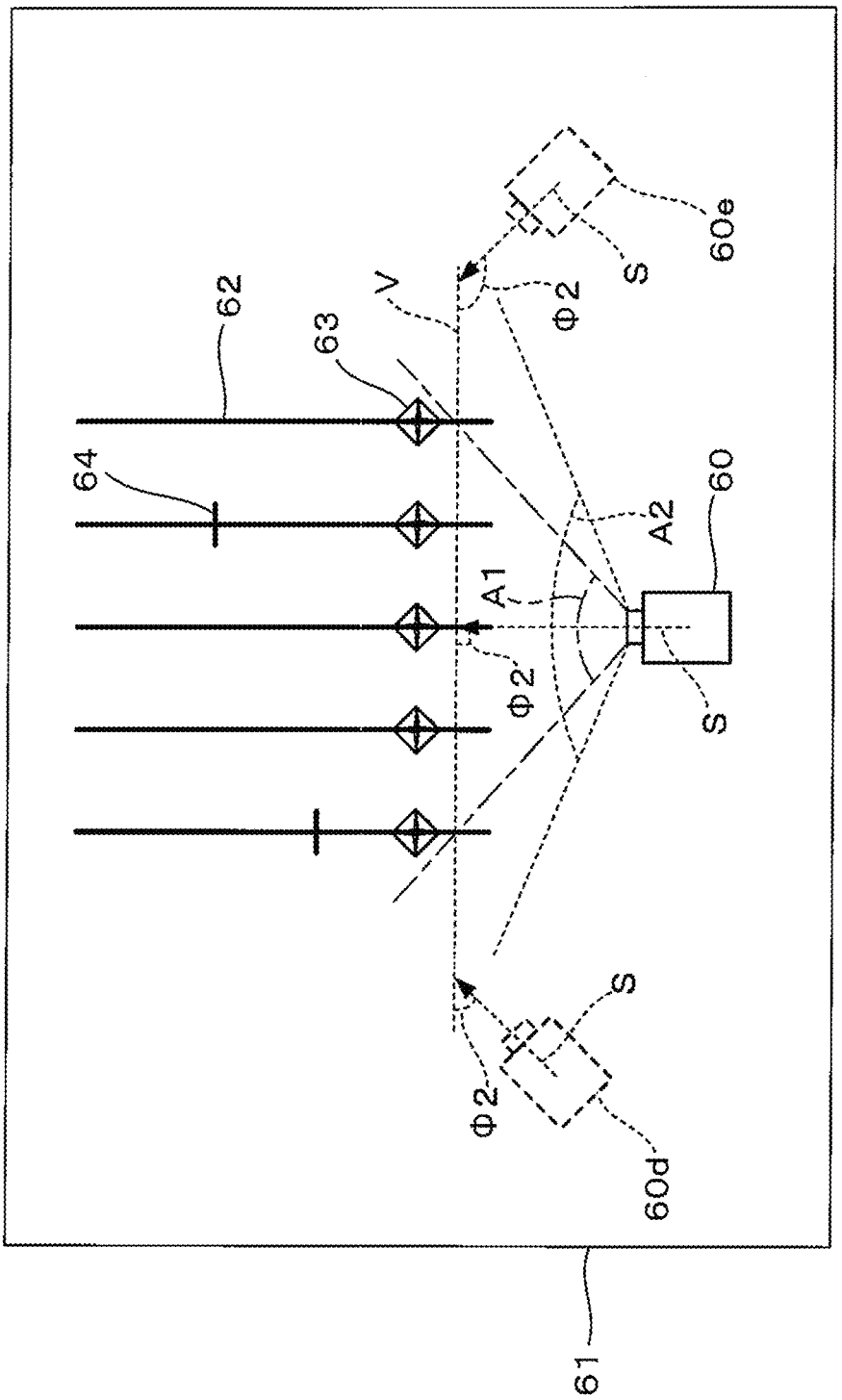
FIG. 8 is an explanation diagram for explaining change of shooting condition with respect to a horizontal direction.

Similarly, the shooting condition of the virtual camera 60 can change with respect to the horizontal direction. FIG. 8 is an explanation diagram for explaining one example of change of the shooting condition between the normal mode and the special mode under a situation that the virtual three-dimensional space is viewed from the upside thereof. More concretely, the example shown in FIG. 8 is an explanation diagram for explaining the change of the shooting condition with respect to the horizontal direction. Further, in the example of FIG. 8, a forth dash line 60d and a fifth dash line 60e indicate one example of the position of the virtual camera 60 and shooting angle after change. As shown in FIG. 8, for example, in the special mode, the position of the virtual camera 60 and the like may be changed to the positions and the like indicated by the fourth and fifth dash lines 60d and 60e.

Concretely, in the normal mode, the virtual camera 60 is located, for example, at the almost center of the five lanes 62 with respect to the horizontal direction. As one example, the shooting direction S coincides with the direction where the lanes 62 in a case that the virtual three-dimensional space is viewed from the upside thereof. As a result, an angle φ2 between the shooting direction S and the vertical plane V orthogonal to each lane is 90-degree. That is, in this case, the virtual camera 60 shoots the lanes 62 from the almost front side so that the lanes 62 are arranged symmetrically within the shooting range.

On the other hand, in a case of the position indicated by the fourth dash line 60d, the virtual camera 60 has moved leftward from its position of the normal mode. Concretely, in a case of the position indicated by the fourth dash line 60d, the virtual camera 60 is located on the left side of the lanes 62 and shoots the lanes 62 and the like from obliquely left front side. As a result, the angle φ2 between the shooting direction S and the vertical plane V becomes an acute angle less than 90-degree. That is, the shooting angle changes along with the positional change to the position indicated by the fourth dash line 60d. The position indicated by the fifth dash line 60e is a position symmetrical to the position indicated by the fourth dash line 60d across the lanes 62. That is, as shown by the fifth dash line 60e, the angle φ2 between the shooting direction S and the vertical plane V becomes an obtuse angle, and the virtual camera 60 may shoot the lanes 62 from obliquely right front side of the lanes 62. In this way, the position of the virtual camera 60 may be changed with respect to the horizontal direction. Further, the shooting angle may be also changed so as to apply to the positional change.

A dot-and-dash line A1 of an example shown in FIG. 8 indicates one example of a field angle of the virtual camera 60 in the normal mode. On the other hand, a dash line A2 indicates one example of a field angle of the virtual camera 60 in the special mode. As shown in FIG. 8, the field angle of the dash line A2 is made to be a wide-angle one so as to be larger than the field angle of the normal mode. In this way, as the change of shooting condition, the field angle may be changed. The change of the field angle may occur with the change of the position and shooting angle above mentioned.

In the special mode, the shooting condition which is different from the one in the normal mode may be used fixedly. Alternatively, various shooting conditions which differ between the normal and special modes, as mentioned above, may be used depending on a specifying condition. That is, in the special mode, the shooting condition may be used depending on the specifying condition. For example, as the specifying condition, operations for specifying the various shooting conditions respectively may be employed. Such operation may be realized by a dedicated operation portion, or may be realized by the rotational button(s) B or a combination of the rotational button(s) B and the foot pedal 8. As the specifying condition, an item-use state, a selection state with respect to options, a score state, and/or the like in the music game may be employed.

Figure 9:
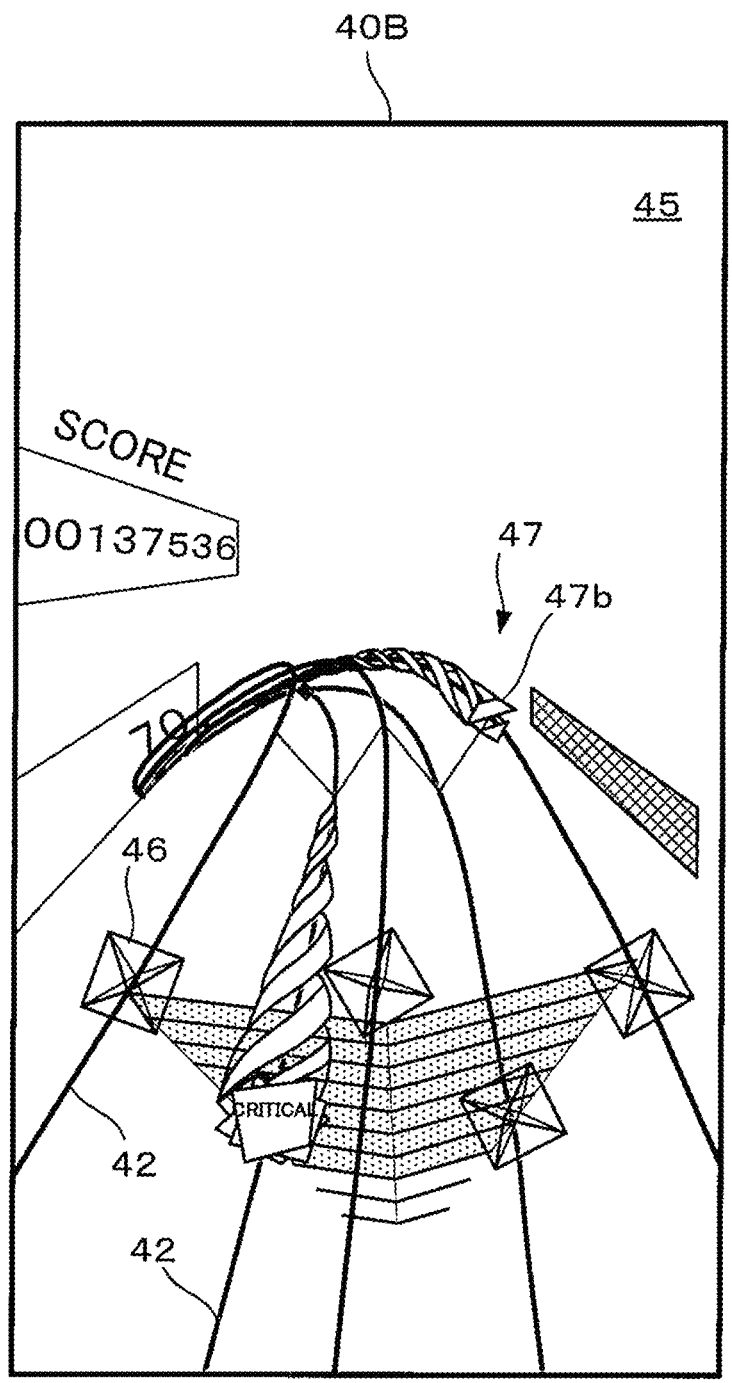
FIG. 9 is a diagram schematically showing one example of a special game screen obtained in a state that a virtual camera is disposed on shooting condition of a first dash line shown in FIG. 7.

FIGS. 9 though 13 are diagrams showing schematically one part of examples of a special game screen provided in the special mode. For example, FIG. 9 is a diagram showing schematically one example of a special game screen 40B displayed when the vertical camera 60 is disposed at the position of the first dash line 60a shown in FIG. 7 as the shooting condition. As shown in FIG. 9, in this case, along with the change of the position and shooting angle of the virtual camera 60 (the change for making the virtual camera 60 closer to the front of the lanes 62), the lane images 42 and the like are shown in the special game screen 40B so as to be more closed up in a comparison with the lane images 42 shown in the normal game screen 40A. Concretely, each of the evaluation sign images 46 is displayed more largely at a nearer position. Similarly, the object image 47 existing near each evaluation sign image 46 is also displayed more largely. Further, because the length of each lane 62 included in the shooting range becomes longer, each lane image 42 in the special game screen 40B becomes longer than the corresponding one in the normal game screen 40A. How-ever, along with the shooting angle made to be blunted, the five lane images 42 are displayed so as to look like only one lane until a nearer side (a position near each evaluation sign image 46). As a result, the range which allows a user to determine which one of the five lane images 42 each object image 47 is disposed on becomes short. On the other hand, there is no change in the operation timing when an appropriate operation should be performed. That is, a distance between the position where a user can recognize clearly each object image 47 and the position of each evaluation sign image 47 becomes short. Due to this, in the special game screen 40B, the user feels that the moving speed of each evaluation sign image 46 is faster (the bodily sensation speed increases). Thereby, a difficulty level increases. Accordingly, a certain privilege, such as increase of the amount of score corresponding to an evaluation result, or speed up of increase of the mode change value 50a, may be provided in the special mode. Alternatively, the special mode may be provided only for providing the bodily sensational change (without the other privileges).

Figure 10:
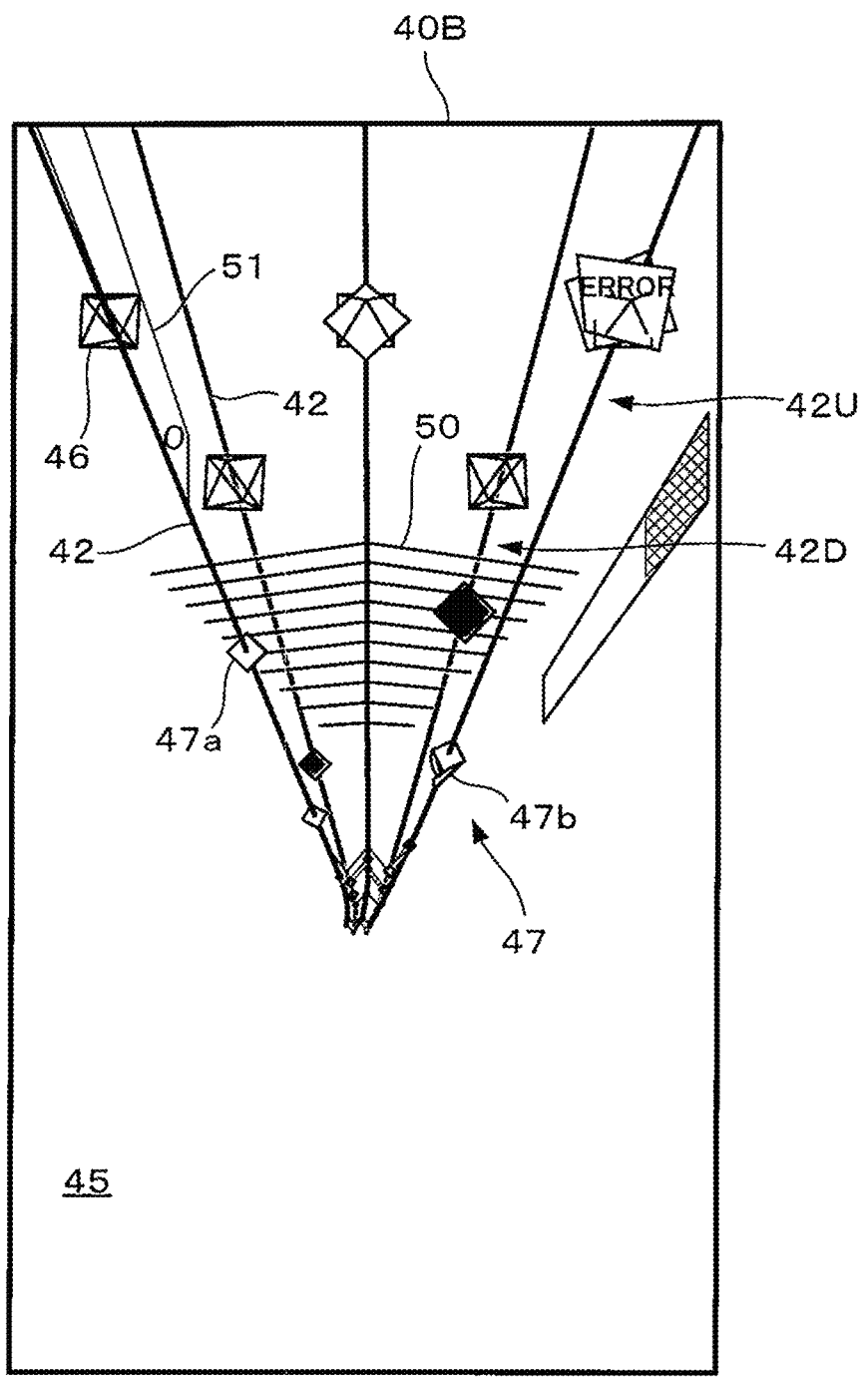
FIG. 10 is a diagram schematically showing one example of a special game screen obtained in a state that the virtual camera is disposed on shooting condition of a second dash line shown in FIG. 7.

FIG. 10 is a diagram showing schematically one example of the special game screen 40B displayed in a case that the virtual camera 60 is disposed according to the second dash line 60b shown in FIG. 7 as the shooting condition. As shown in FIG. 10, though the lane images 42 and the like are located at the lower side in the normal game screen 40A, in this case, the lane images 42 and the like are located at the upper side in the special game screen 40B, along with the change of the position and shooting angle of the virtual camera 60 (the change for making the virtual camera 60 located at the lower side of the lanes 62). Further, since the lanes 62 are shot from the lower side thereof, the lower lane image group 42D is located on the nearer side in comparison with the located position in the normal game screen 40A. As a result, each evaluation sign image 46 of the lower lane image group 42D is displayed somewhat more largely than each evaluation sign image 46 of the upper lane image group 42U. Similarly, the score display filed 51 moves across the lane images 42 to a position above the lane images 42. In the example shown in FIG. 10, as one example of notification of an erroneous operation, characters "ERROR" and visual representation therefor are added at the position of the evaluation sign image 46 of the right-end lane image 42.

Figure 11:
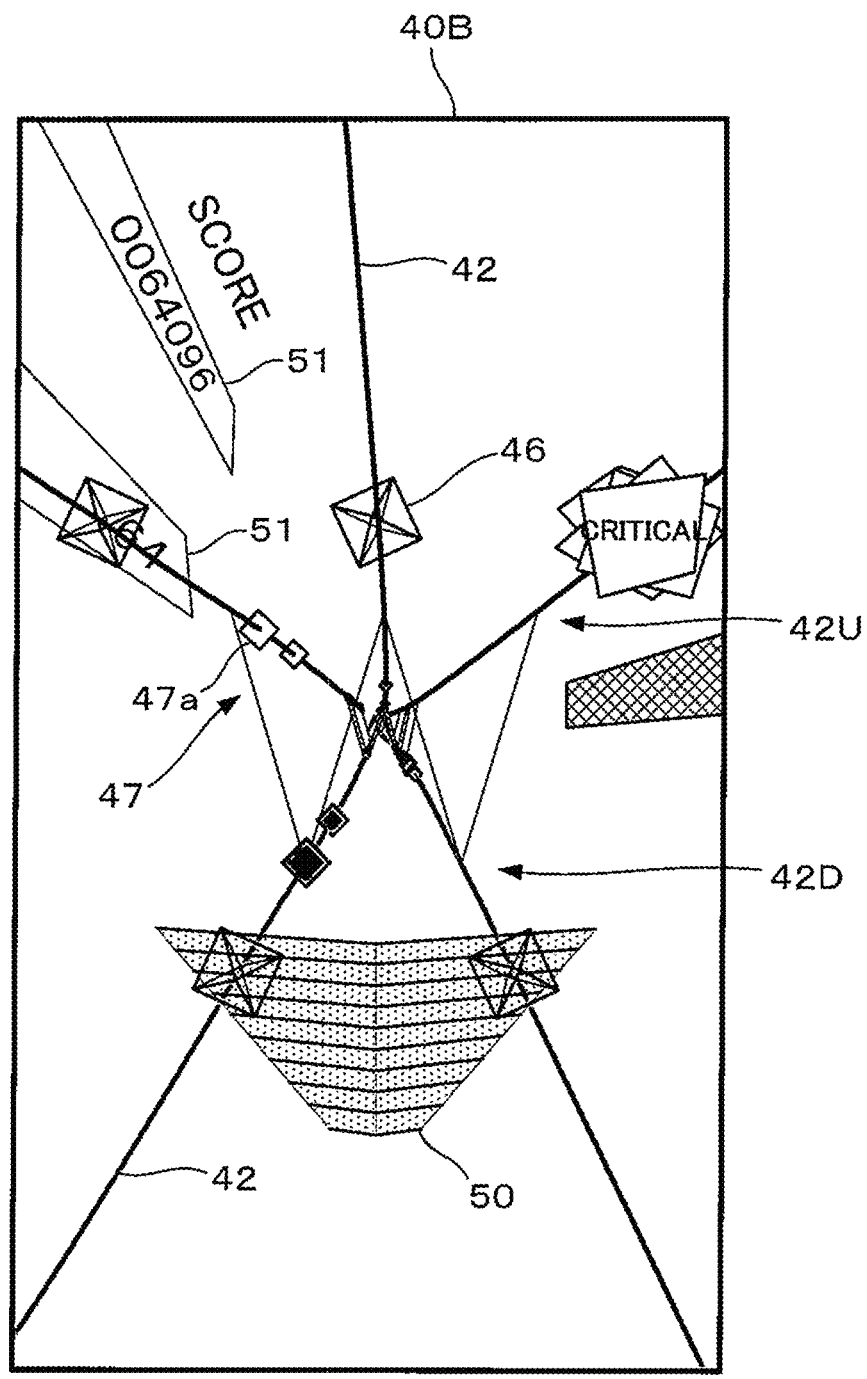
FIG. 11 is a diagram schematically showing one example of a special game screen obtained in a state that the virtual camera is disposed on shooting condition of a third dash line shown in FIG. 7.

FIG. 11 is a diagram showing schematically one example of the special game screen 40B displayed in a case that virtual camera 60 is disposed according to the third dash line 60c shown in FIG. 7 as the shooting condition. As shown in FIG. 11, in this case, the lane images 42 are displayed so as to extend radially from the near center in the special game screen 40B, along with the change of the position and shooting angle of the virtual camera 60 (the change for making the virtual camera 60 located at the position between the upper lane group 62U and the lower lane group 62D). More concretely, the upper lane image group 42U and the lower lane image group 42D are displayed so as to extend in different directions from each other, upward and downward, respectively.

Figure 12:
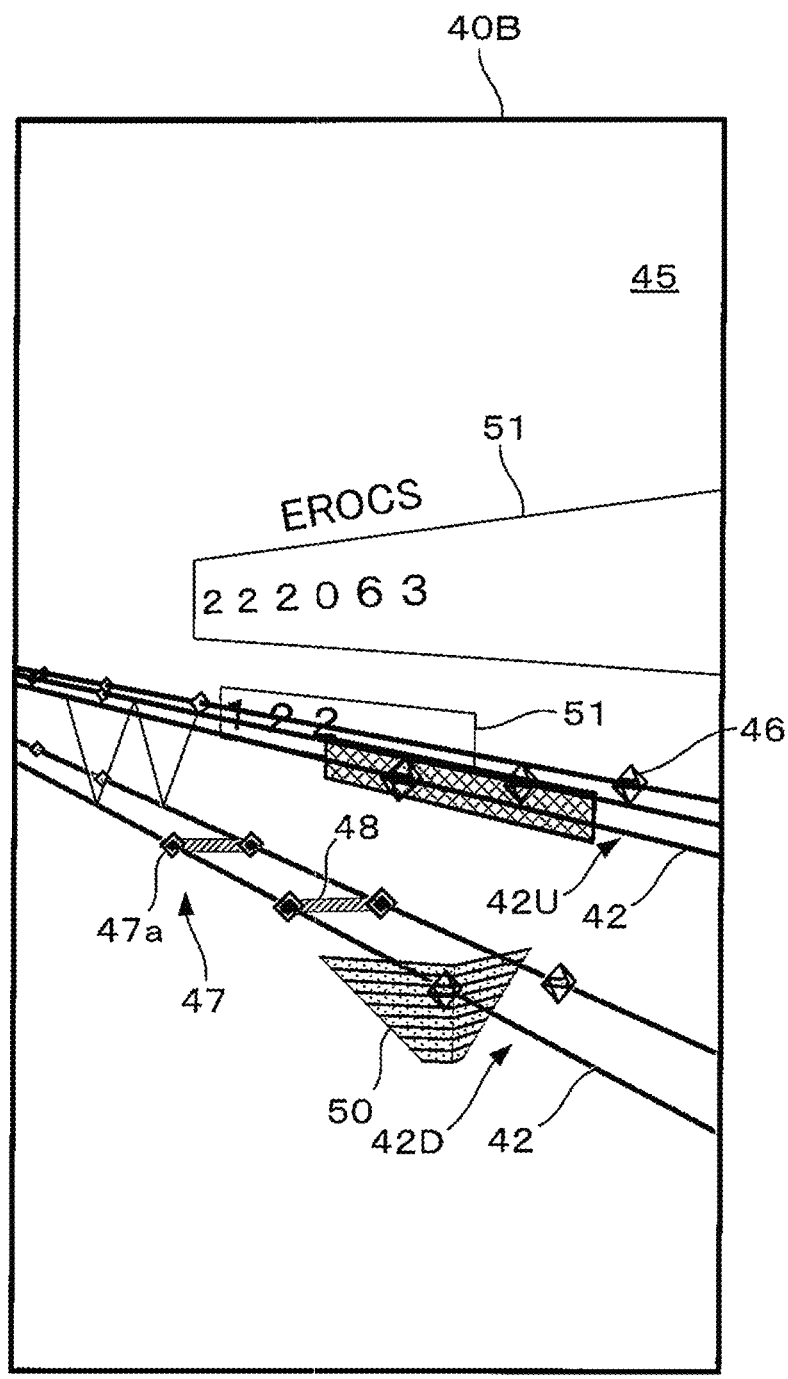
FIG. 12 is a diagram schematically showing one example of a special game screen obtained in a state that the virtual camera is disposed on shooting condition of a fourth dash line shown in FIG. 8.

FIG. 12 is a diagram showing schematically one example of the special game screen 40B displayed when the virtual camera 60 is disposed at the position of the fourth dash line 60d shown in FIG. 8 as the shooting condition. As shown in FIG. 12, in this case, each lane images 42 is displayed so as to extend from the left side toward the right side in the special game screen 40B, along with change of the position and shooting angle of the virtual camera 60 (change for making the virtual camera 60 located at the position of the left front side). Concretely, each of the lane images 42 is displayed so as to extend from the left deeper side toward the right nearer side. Further, a height difference between a surface (a layer) formed by the upper lane image group 42U and a surface (a layer) formed by the lower lane image group 42D is clearly displayed.

Further, in the example shown in FIG. 12, score information (an accumulated score and the like) is displayed on the score display filed 51 so as to be reversed. Concretely, for example, the accumulated score information "108400" or the characters "SCORE" are displayed so as to be made out sequentially from the left to the right in the normal game screen 40A. On the other hand, in the example shown in FIG. 12, they are displayed so as to be made out from the right to the left. For example, the accumulated score information "360222" is displayed so as to be made out from the right to the left. Same applies to the characters "SCORE". As one example, as mentioned above, the two-dimensional image where the shooting condition has been changed in comparison with the normal game screen 40A is used as the special game screen 40B, and through such a special game screen 40B the special mode is provided. The displayed state of information which is displayed on the score display field 51 may be set as appropriate. For example, in the example in FIG. 12, as the displayed state of the characters "SCORE" and the like, various display states may be applied, such as a state that the characters "SCORE" and the like displayed in the normal game screen 40A are viewed from the back (a state that characters to be displayed have been reversed), or a state that the characters and the like have been reflected on a mirror (the mirror reflection).

The special game screen 40B is not limited to an example that the two-dimensional image where the shooting condition has been changed in comparison with the normal game screen 40A is used. For example, in the special mode, the special game screen 40B which is different from the normal game screen 40A in a matter other than the shooting condition may be used. As such a difference, for example, a difference in arrangement of the lane images 42 may be employed. For example, as the difference in arrangement of the lane images 42, the height difference between the lane images 42 may be changed. More concretely, for example, as the change of the height difference between the lane images 42, a change such that the height difference between the upper lane image group 42U and the lower lane image group 42D is inverted may be employed.

Figure 13:
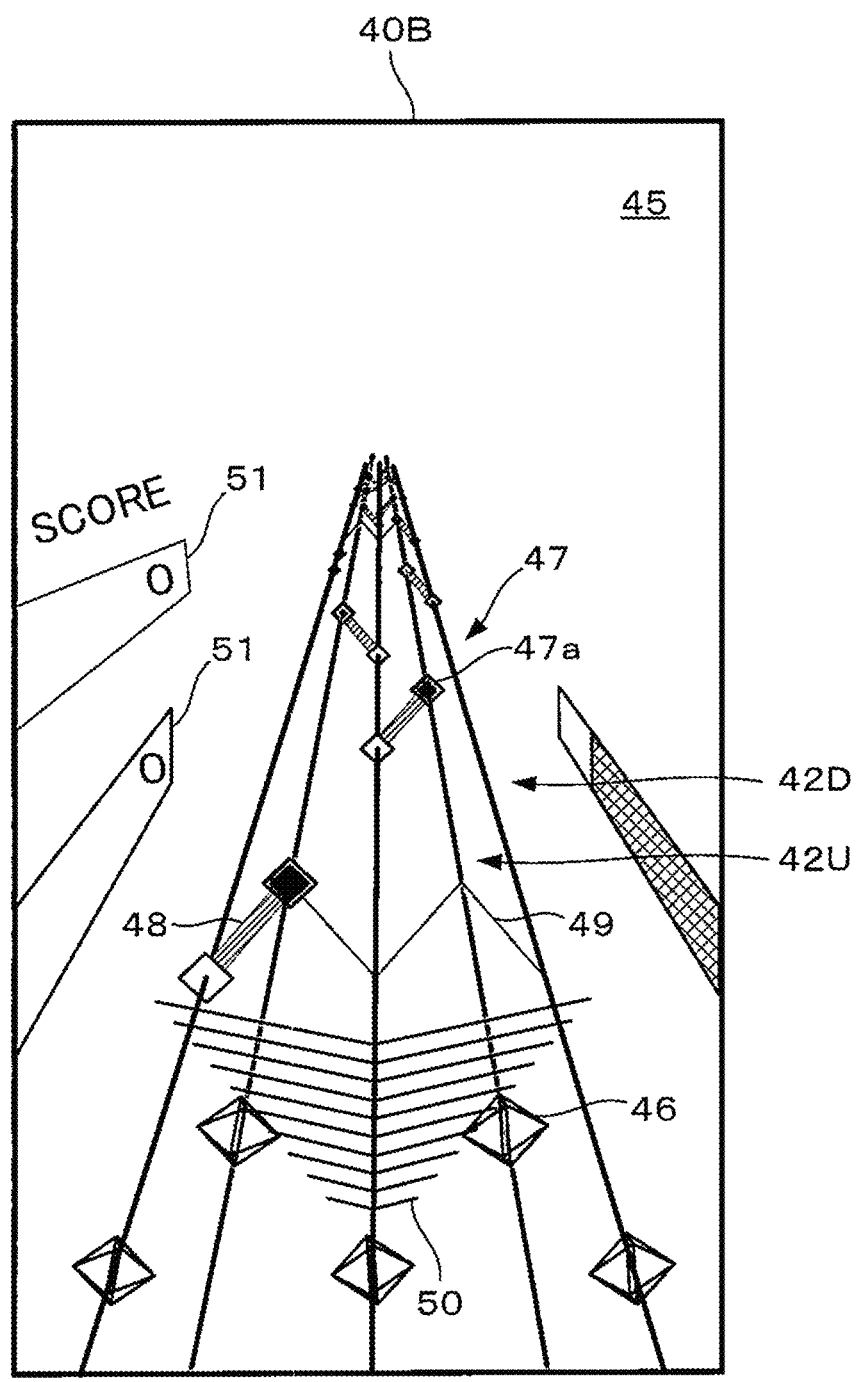
FIG. 13 is a diagram showing one example of a special game screen where the height difference between an upper lane image group and a lower lane image group has been inverted.

FIG. 13 is a diagram showing one example of the special game screen 40B where the height difference between the upper lane image group 42U and the lower lane image group 42D has been inverted. As shown in FIG. 13, in this case, in the special game screen 40B, in comparison with the normal game screen 40A, the height difference between the upper lane image group 42U and the lower lane image group 42D has been inverted, and the lower lane image group 42D is arranged above the upper lane image group 42U. In other words, each of the five lane images 42 is disposed so as to be located at each corner of a character "M" (the inversion of the character "W"). In this case, for example, if the correlation between each lane image 42 and each rotational button B is maintained, since the actual arrangement of the rotational buttons B is an inversion condition of the arrangement of the lane images 42 displayed, the difficulty level increases. The special mode may be provided through such a special game screen 40B as one example.

Further, for example, as the special game screen 40B, without change of the shooting condition, the length of each lane image 42 (the length of each lane 62) may be changed so that a movement distance (a distance of relative displacement) between each evaluation sign image 46 and each object image 47 is changed. That is, though the special game screen 40B has the same shooting condition as the normal game screen 40A, in the special game screen 40B, the lane images 42 may be made longer (or shorter) than the lane images 42 in the normal game screen 40A. Also, in this case, since there is no change in operation timing, it is possible to make the bodily sensation moving speed of each object image 47 fast (or slow). Or, though the normal game screen 40A is used in the special mode as with the normal mode, the change may be realized by increase or decrease in number of the object images 47 in comparison with the number in the normal mode.

Further, the change with respect to the height difference, the movement distance, or the like may occur together with the other various kinds of change including the change of shooting condition mentioned above. In this case, the change with respect to the height difference, the movement distance, or the like, may occur in a case the special condition has been satisfied, or may occur based on another condition different from the special condition. For example, the change of height difference may occur when a presentation condition has been satisfied, and the change of the movement distance may occur when a change condition has been satisfied. For example, the presentation condition and the change condition may be satisfied when a value, different from the mode change value 50a, has become a predetermined amount or more, the value being given according to items, score state, or the like in the game. Such a value may be shared by both of the presentation condition and the change condition, or may be prepared differently from each other. The mode change value 50a may be shared for determination of those conditions, while being associated with different operations from each other. Accordingly, as the presentation condition and the change condition, the same condition may be employed.

Next, the details of the sequence data 38 will be described. The sequence data 38 is data having operation timings when the user should perform the pressing operation and the rotation operation to each rotational button B. Accordingly, the sequence data 38 is used, as one example, for displaying the various types of objects 64 (or the object images 47) each being disposed at an appropriate position along with elapsed time. Concretely, the object images 47 corresponding to the operation timings of the sequence data 38 are displayed along the lane images 42 respectively, so that each of the operation timings is guided by the coincidence of a position of each evaluation sign image 46 and a position of each object image 47. Further, in order to realize such a display, the sequence data 38 is also used for disposition of the objects 64 in the virtual three-dimensional space 61. As one example, the sequence data 38 is prepared for each tune (or, for each difficulty level of each tune).

Figure 14:
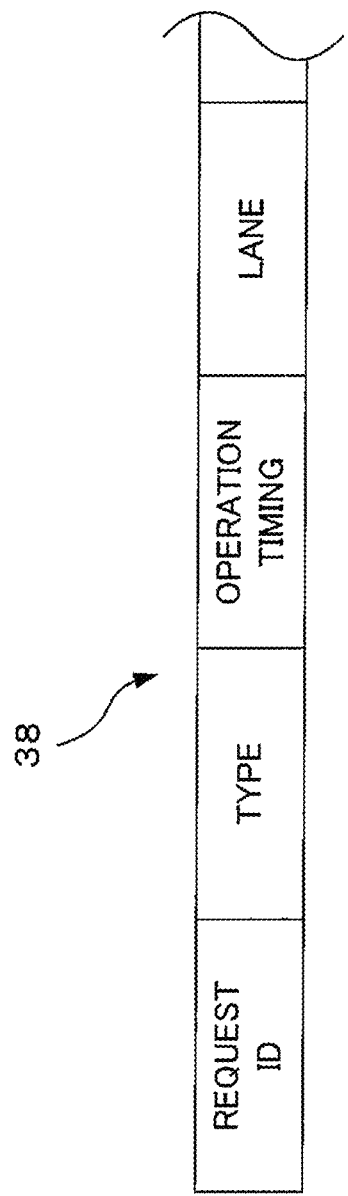
FIG. 14 is a diagram showing one example of the contents of sequence data.

FIG. 14 is a diagram showing one example of the contents of the sequence data 38. As shown in FIG. 14, the sequence data 38 includes, as one example, some pieces of information: a request ID, the type, the operation timing, and the lane. The sequence data 38 is constructed, for example, as a collection of records each record having those pieces information so as to be associated with each other.

The request ID information is information for identifying the operation timings. Accordingly, as the request ID information, ID information set uniquely for each operation timing is used. Each operation timing (that is, the object 64 and object image 47 corresponding to the operation timing) is specified by the request ID. The type information is information indicating the type of the object 64 and object image 47. For example, as the type information, information indicating the first operation object image 47a, the second operation object image 47b, or the like is used. That is, by the type information, the type of the object 64 and object image 47 corresponding to the operation timing are specified.

The operation timing information is information indicating the timing when the pressing operation or the rotation operation should be performed. As the operation timing information, for example, information indicating elapsed time from a start timing of the tune is used. Concretely, the operation timing information includes values indicating the bar number in the tune, the number of beats, and time in a beat, the values being separated with commas for each value. The lane information is information indicating the lane 62 and lane image 42 where the object 64 and object image 47 should be disposed. As the lane information, for example, the number indicating each lane 62 and each lane image 42 is used. As one example of the number, in a case that the lanes 62 and lane images 42 are numbered sequentially from the left side, the number corresponding to each lane 62 and each lane image 42 may be used. In this case, it does not matter whether the numbers are considered for a positional difference in the vertical direction.

Next, area presentation processing and sequence processing will be described. The area presentation processing is processing for presenting the game area 45. The contents of the game area 45 are changed depending on whether to provide the normal mode or the special mode. The contents of the game screen 40 (hereinafter, in a case that the normal game screen 40A and the special game screen 40B are not distinguished from each other, these screens are sometimes collectively called the game image 40) are changed depending on the contents of the game area 45. Due to this, the area presentation processing is also used for determining whether to present the normal game screen 40A or the special game screen 40B. The sequence processing is processing for disposing each object image 47 at an appropriate position of each lane image 42 in the game area 45. As one example, the sequence processing is executed as one part of the area presentation processing.

Figure 15:
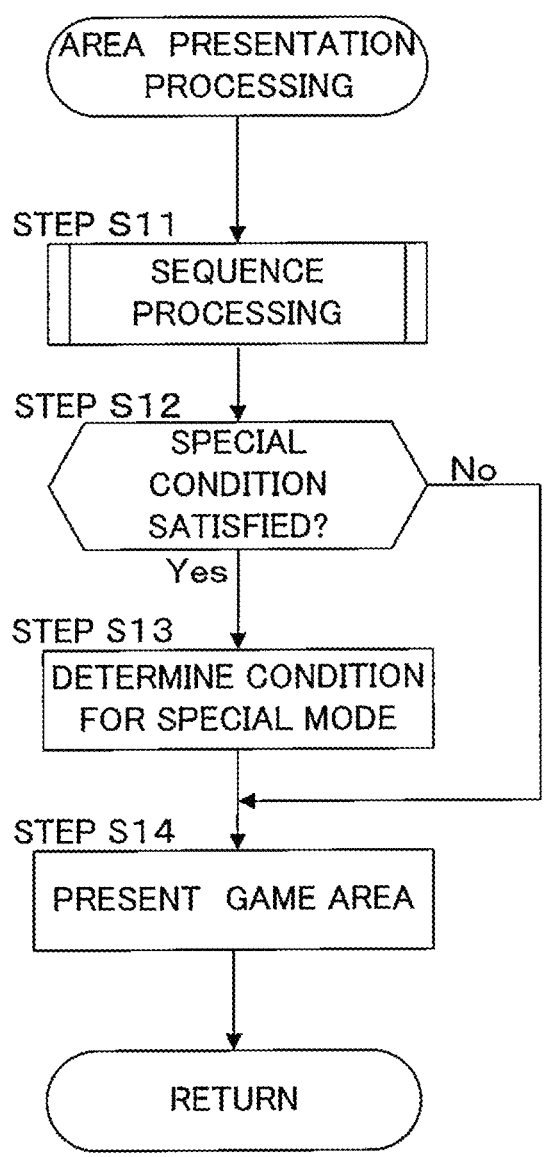
FIG. 15 is a diagram showing one example of a flowchart of area presenting processing routine.

For example, by the control unit 30 of the game machine GM, the area presentation processing and the sequence processing are realized through a routine shown in FIG. 15 and a routine shown in FIG. 16 respectively. Concretely, both of the routines in FIGS. 15 and 16 are executed by the control unit 30 through the game providing portion 37. The control unit 30 of the game machine GM and the control unit 10 of the center server 2 execute independently from or cooperatively with each other, various kinds of well-known processing and the like in addition to the above mentioned kinds of processing. However, the details of such well-known processing are omitted.

FIG. 15 is a diagram showing one example of a flowchart of an area presentation processing routine for realizing the area presentation processing. The routine in FIG. 15 is executed repeatedly in a predetermined cyclic fashion during game-play of the music game in the normal mode. When the routine in FIG. 15 is started, the game providing portion 37 first executes the sequence processing in step S11. The details of the sequence processing will be described later.

In subsequent step S12, the game providing portion 37 determines whether the special condition has been satisfied or not. For example, as mentioned above, the special condition has been satisfied in a case that the foot pedal 8 has been operated after the mode change value 50a exceeded a predetermined amount. Accordingly, as one example, the game providing portion 37 determines whether the special condition has been satisfied or not based on the amount of the mode change value 50a and the output signal from the foot pedal 8. In a case that the determination result is a negative result, that is, the special condition has not been satisfied, the game providing portion 37 skips step S13 and goes to step S14.

On the other hand, in a case that the determination result in step S12 is an affirmative result, that is, the special condition has been satisfied, the game providing portion 37 goes to step S13. In step S13, the game providing portion 37 determines a condition for providing the special mode. For example, in a case that the special mode is provided by change of shooting condition, the shooting condition for the special mode is determined as the shooting condition. That is, the shooting condition for the normal mode is changed to the shooting condition for the special mode. For example, in a case that the shooting condition for providing the special game screen 40B is fixedly set, shooting condition is changed to the contents fixedly set (for example, the state of any one of the first to fifth dash lines 60a to 60e or the like). In a case that the shooting condition is set depending on the specifying condition, the specifying condition of this time is specified. For example, in a case that operational state of the rotational buttons B or the foot pedal 8 are used, the specifying condition is specified depending on output signals from the rotational buttons B or output signal from the foot pedal 8. Then, the game providing portion 37 changes shooting condition to the contents corresponding to the specifying condition specified. Alternatively, in a case that the special mode is provided by the inversion of the height difference of the lane images 42, in step S13, a condition for inverting the arrangement of the lane images 42 may be determined as a condition for presenting the game area 45. As one example, the following describes a case that the special mode is provided by change of shooting condition.

In subsequent step S14, the game providing portion 37 generates and presents as the game area 45, a two-dimensional image corresponding to a shooting result obtained when the three-dimensional space 61 is shot by the virtual camera 60 under the shooting condition for the normal mode or the shooting condition set in step S13 (the shooting condition for the special mode). When completing the processing of step S14, the game providing portion 37 ends the current routine. Thereby, the game screen 40 is displayed on the monitor MO, the game screen 40 including the game area 45 representing the virtual three-dimensional space 61. More concretely, the normal game screen 40A representing the virtual three-dimensional space 61 is displayed on the monitor MO in the normal mode, and the special game screen 40B representing the virtual three-dimensional space 61 is displayed on the monitor MO in the special mode.

FIG. 16 is a diagram showing one example of a flowchart of the sequence processing routine for realizing the sequence processing. As one example, the routine shown in FIG. 16 is executed, when being called in step S11 of the routine shown in FIG. 15. When the routine of FIG. 16 is started, first, the game providing portion 37 acquires the current time of the tune in step S21.

In next step S22, the game providing portion 37 acquires the sequence data 38 with respect to a display range. This acquisition is executed so that the sequence data 38 acquired includes records each having the operation timing within a time length which is possible to be displayed in the game area 45 (the display range). For example, the display range is set to the time length corresponding to four bars of the tune from the current time. Further, the display range may be set depending on the shooting condition such as the shooting position, the shooting angle, or the field angle. For example, longer lane image 42 can be displayed as the virtual camera 60 is located at a higher shooting position. Therefore, in this case, the display range may be set to a longer range (for example, set to six bars). Also, the shooting angle and field angle may influence the display range setting in a similar way.

In subsequent step S23, the game providing portion 37 determines the type of the object 64 corresponding to each operation timing and the lane 62 (any one of the five lanes 62) where the object 64 should be disposed. This determination is executed based on the type information and lane information associated with each operation timing in the sequence data 38.

In the next step S24, the game providing portion 37 calculates coordinate points of all objects 64 included in the display range, based on the acquisition results of steps S21 to S23. The calculation is executed as the following, for example. Concretely, the game providing portion 37 calculates a position corresponding to each operation timing of each lane 62 (the determination result of step S23 is used) as a distance from each evaluation sign 63 (the current time), so that each lane 62 and each evaluation sign 63 correspond to the time axis and the current time respectively. That is, according to time difference between each operation timing and the current time, the game providing portion 37 calculates the position on each lane 62 corresponding to each evaluation sign 63 with respect to a time-axis direction from the evaluation sign 63 (that is, the movement direction of the evaluation sign 63). And then, the calculated position on each lane 62 is calculated as the coordinate point of each object. As one example, the calculation of coordinate points is executed in the above mentioned way.

In the next step S25, the game providing portion 37 disposes the corresponding type of object 64 (the determination result of step S23 is used) on each coordinate point calculated in step S24. In subsequent step S26, the game providing portion 37 determines whether the interval condition is satisfied. As mentioned above, the interval condition is satisfied, as one example, by the same action timing corresponding to the lanes 62 different from each other. Accordingly, the game providing portion 37 determines, for example, whether there are such objects 64 in the display range that correspond to the same operation timing but each existing on different lanes 62 from each other. When this determination is negative, that is, there are no such objects, the game providing portion 37 determines that the interval condition is not satisfied. On the other hand, when this determination is affirmative, that is, there are such objects, the game providing portion 37 determines that the interval condition is satisfied. When the determination result of step S26 is negative, that is, the interval condition is not satisfied, the game providing portion 37 skips step S27 and ends the current routine. In this case, the game providing portion 37 returns to the routine of FIG. 15 to executes the processing in step S12 and after.

On the other hand, when the determination result in step S26 is negative, that is, the interval condition is satisfied, the game providing portion 37 goes to step S27. In step S27, the game providing portion 37 disposes a subsidiary sign body corresponding to the subsidiary sign in the virtual three-dimensional space 61. Concretely, the game providing portion 37 disposes the subsidiary sign body (which is displayed as a subsidiary line 48 in the game area 45) connecting between objects 64 in the virtual three-dimensional space 61, so that the subsidiary line 48 connecting between the objects 64 which satisfy the interval condition is displayed. After completing the processing of step S27, the game providing portion 37 ends the current routine. Then, the game providing portion 37 returns to the routine of FIG. 15 to execute the processing in step S12 and after.

By the routine shown in FIG. 16, each type of object 64 is disposed at an appropriate position on each lane 62 of the virtual three-dimensional space 61. Further, each evaluation sign 63 moves so as to pass through each object 64 at the moment of each operation timing. By the routine shown in FIG. 15, the game area 45 corresponding to such a virtual three-dimensional space 61 is displayed on the game screen 40. That is, by the routines of FIGS. 15 and 16, each object image 47 is disposed at an appropriate position on each lane image 42 in the game area 45. Further, each evaluation sign image 46 moves so as to pass through each object image 47 at the moment of each operation timing. That is, the positions of each evaluation sign image 46 and each object image 47 are controlled so that each operation timing is guided by a coincidence, which occurs over time, of the positions of the evaluation sign image 46 and the object image 47.

As explained above, according to the present embodiment, the evaluation sign image 46 and the object image 47 are disposed along the lane image 42. Further, the lane images 42 are divided into the upper lane image group 42U and the lower lane image group 42D and disposed in a layered manner with respect to the vertical direction. Accordingly, it is possible to guide operation timings by using both of the upper and lower lane image groups 42U, 42D which are located vertically in a layered manner. Thereby, it is possible to break up the line of sight of a user vertically: the upper lane image group 42U and the lower lane image group 42D.

Further, in the game screen 40, the game area 45 representing the virtual three-dimensional space 61 is displayed. Due to this, in the game area 45, each lane image 42 is displayed so as to extend from the deeper side DS toward the nearer side NS. As a result, it is possible to generate the parallax with respect to the vertical direction, between the upper lane image group 42U and the lower lane image group 42D. Thereby, while it is possible to further utilize the stereoscopic effect of the game screen 40, it is possible to change a difficulty level of the game using the parallax.

On the other hand, each evaluation sign image 46 is disposed on each lane image 42. Thereby, it is possible to make a user recognize the parallax through each evaluation sign image 46. Further, with respect to each lane image 42, the interval sign 49 connecting the lane images 42 is displayed at predetermined intervals. Concretely, the interval sign 49 is displayed at one-bar intervals. Thereby, while it is possible to provide a rough indication of the operation timing through the interval signs 49, by using a connection line as the interval sign 49, even at a position far from the evaluation sign image 46, it is possible to make a user recognize the influence of parallax at one-bar intervals through the interval sign 49. Further, in a case that the object images 47 indicating same operation timing are disposed on the lane images 42 respectively, the lane images 42 being different from each other, the subsidiary line 48 connecting the corresponding object images 47 is displayed as the subsidiary sign indicating the case. Thereby, it is possible to make a user recognize the object images 47 corresponding to same operation timing. That is, even if the parallax occurs between the object images 47, it is possible to make a user recognize through the subsidiary line 48, the relation of the object images 47 corresponding to the same operation timing. For example, even in a case that the positions of the object images 47, or the timings of coincidence with the evaluation sign images 46 look different from each other because of the parallax, it is possible to make a user recognize that those correspond to a same position or same timing. Thereby, it is possible to suppress false recognition caused by the parallax.

Further, each of the upper lane image group 42U and the lower lane image group 42D is colored differently from each other. And, the color of the lane image group is reflected on each object image 47. Concretely, each object image 47 is colored with the color corresponding to the lane image 42 where the object image 47 is disposed. Thereby, it is possible to make a user recognize the lane image 42 where each object image 47 is located by the color. More concretely, since it is possible to make it easy through the coloring, to distinguish each lane image group to which each object image 47 belongs, it is possible to aid appropriately the user to distinguish the lane image groups where the object image 47 belongs respectively.

Further, the music game includes the normal mode and the special mode. In the special mode, visual representation different from that in the normal mode is added, for example, by change of the shooting condition of the virtual three-dimensional space 61 from the shooting condition in the normal mode. Thereby, it is possible to add various types of stereoscopic representation to the game area 45. Concretely, for example, by providing the special game screen 40B corresponding to a two-dimensional image obtained when the virtual three-dimensional space 61 is shot from a nearer position with a bigger angle (for example, the position of the second dash line 60b of FIG. 7) than those in the normal mode, it is possible to improve the bodily sensation speed and provide a hurtling sense, and also it is possible to improve a sense of realism. Similarly, also by making a change with respect to the length of each lane image 42 or the movement distance between each object image 47 and each evaluation sign image 46, it is possible to add visual representation which makes the bodily sensation speed of a user improve. Further, it is also possible to add visual representation by inverting the height difference between the upper and lower lane image groups 42U and 42D, that is, counterchanging a relation with respect to the vertical direction. Thereby, it is possible to suppress user's habituation and also improve enjoyability of the game.

The lane images 42 are arranged in such a way as to correspond the rotational buttons B of the control panel 7 respectively, at least in the normal mode. Concretely, the rotational buttons B are arranged in such a way as to form two rows located vertically, each row extending in the horizontal direction. At least in the normal mode, the lane images 42 are also arranged in such a way as to form two layers located vertically, which are the upper lane image group 42U and the lower lane image group 42D corresponding to the two rows of the rotational buttons B. Thereby, it is possible to make a user recognize that the upper lane image group 42U corresponds to the row of the upper button group BU and the lower lane image group 42D corresponds to the row of the lower button group BU. As a result, through those correlations, it is possible to make the user recognize easily the five rotational buttons B corresponding to the five lane images 42 respectively.

In the above embodiment, the control unit 30 of the game machine GM functions as the area presenting device of the present invention by executing the routine of FIG. 15 through the game providing portion 37, and, by further executing the routine of FIG. 16, functions as the sign controlling device of the present invention. Further, the storage unit 31 of the game machine GM functions as the data storing device of the present invention by storing the sequence data 38.

The present invention is not limited to the above embodiments, and can be realized in various embodiments. For example, in the above embodiment, the evaluation sign image 46 and evaluation sign 63 move along each lane image 42 and the like. That is, by the movement of the evaluation sign image 46 and the like, the relative displacement occurs between the evaluation sign image 46 and the like and the object image 47 and the like. However, the relative displacement is not limited to this embodiment. For example, contrarily to the above embodiment, the object image 47 and object 64 may move along each lane image 42 or the like. That is, the relative displacement may occur by the movement of the object image 47 and the like. As long as the relative displacement occurs between the object image 47 and the like and the evaluation sign image 46 and the like, various embodiments, including such a case that both of the images 47 and 46 move, may be employed as the relative displacement of the present invention.

In the above embodiment, the upper lane image group 42U and the lower lane image group 42D are colored with different colors from each other respectively. However, difference in color is not limited to this embodiment. For example, different color from each other may be used for each lane image 62, that is, five different colors from each other may be used for the five lane images 42 respectively. Alternatively, by difference in shape, the lane images 42 may be distinguished between the upper lane image group 42U, the lower lane image group 42D, and the like. That is, as long as it is realized to distinguish the lane images 42 between the upper lane image group 42U, the lower lane image group 42D, and the like, various embodiments may be applied. On the other hand, for example, such distinguishment may be omitted. Same applies to distinguishment of the object images 47 disposed on the lane images 42. On the other hand, the distinguishment of the object images 47 is not limited to the embodiment corresponded to the lane images 42. For example, while the distinguishment to be applied to the lane images 42 is omitted, in order to distinguish the lane images 42 and the like, difference in shape, motion, or the like may be applied to the object images 47. Similarly, the evaluation sign images 46 may be distinguished by using color, shape, or the like so as to correspond to the lane images 42 and the object images 47 respectively. Further, color to be used may be different between the normal mode and the special mode. For example, colors used in the normal mode: one color for the object image 47 disposed in the upper lane image group 42U; and another color for the object image 47 disposed in the lower lane image group 42D, may be exchanged with each other in the special mode, or may be changed to absolutely different colors respectively in the special mode.

In the above embodiment, the five lane images 42 are divided into two layers: the upper lane image group 42U and the lower lane image group 42D. However, the present invention is not limited to this embodiment. For example, a plurality of lane images 42 may be divided into a plurality of lane image groups, each being disposed so as to form layers which are arranged in parallel with respect to the horizontal direction, that is, which extend vertically. The direction where each layer extends is not limited to the horizontal direction or the like. Various layers which extend in various directions may be formed by the plurality of lane image groups. Even in this case, it is also possible to break up the line of sight of a user with respect to the horizontal direction and the like. Accordingly, as a positional difference between the lane images 42, not only the height difference but also horizontal difference may be formed. That is, the plurality of lane images 42 may be arranged so that the positions thereof or the layers are displaced from each other with respect to both of the vertical and horizontal directions. Similarly, the plurality of lane images 42 may be divided into three or more lane image groups. Further, each of the plurality of lane images 42 is not limited to an embodiment that the lane image 42 belongs to any one of the lane image groups. For example, the game area 45 may include a lane image 42 which does not constitute any lane image groups. Further, the plurality of lane images 42 are not limited to an embodiment that a plurality of lane image groups are formed. For example, the plurality of lane images 42 may be disposed one by one so that at least one part of the lane images 42 forms a height difference or the like (a zigzag state, one row extending in the vertical direction, or the like), without forming the plurality of lane image groups or layers. Accordingly, the plurality of lane images 42 are not limited to the embodiment that one part of the plurality of lane images 42, such as a space between the upper lane image group 42U and the lower lane image group 42D, forms the height difference or the like. For example, the height difference or the like may be provided to all spaces between the lane images 42.

In the above mentioned embodiment, in order to provide the game screen 40 where the stereoscopic representation is displayed, the virtual three-dimensional space 61 is configured and shot by the virtual camera 60. Then, a two-dimensional image corresponding to the shooting result is used as the game area 45. However, the game area 45 is not limited to this embodiment. For example, a two-dimensional image corresponding to the shooting result of the virtual three-dimensional space 61, that is, a two-dimensional image which looks like a stereoscopic image is prepared in advance, and the two-dimensional image may be used as the game area 45. That is, it may be omitted to construct the virtual three-dimensional space 61. Alternatively, the game area 45 is not limited to a two-dimensional image corresponding to the virtual three-dimensional space 61. For example, a two-dimensional image which, though not actually corresponds to the virtual three-dimensional space 61, provides stereoscopically visual effect may be used as the game area 45. Further, the game area is not limited to a two-dimensional image where the stereoscopic representation is displayed. As long as the height difference or the like is formed between at least one portion of the lane images 42, a two-dimensional image where planar representation is displayed may be used as the game area. Accordingly, the direction where each of the lane images 42 extends is not limited to the direction from the deeper side DS to the nearer side NS of the game area 45. Various directions, such as the horizontal direction or the vertical direction, may be employed as the direction where the lane image 42 extends, depending on the visual representation in the game area 45.

In the above embodiment, as the special mode, a same music game with different shooting condition or the like is provided. However, the special mode of the game is not limited to this embodiment. For example, as the special mode, various types of games different from the music game may be provided, such as an action game, a roll-playing game, an adventure game, a simulation game, a puzzle game, a card game, a shooting game, a sports game, or a complex game. Further, the game provided by the game machine GM is not limited to the music game. That is, the game in the normal mode is also not limited to the music game, and as with the special mode, various types of games may be employed as the game in the normal mode. In this case, for example, depending on each type of game, any two of various characters, things, items, and the like which appear in the game may be employed as the two types of sign images (corresponding to the indicative sign and reference sign) of the present invention. Also, with respect to the lane images, various embodiments may be employed depending on each type of game. That is, the lane image is a term including various embodiments each functioning as the time axis.

Further, the game machine GM is not limited to a game machine for business use. As the game machine GM, an appropriate embodiment may be employed, such as a stationary game machine for home use (including a stationary personal computer capable of executing a game), or a portable game machine (including a portable terminal capable of executing a game such as a smart phone, a tablet PC, a portable personal computer, and the like). In the above embodiment, the control unit 30 and the storage unit 31 are provided in the game machine GM. However, the game machine of the present invention is not limited to this embodiment. For example, the control unit 30 and the storage unit 31 may be provided logically on the network by using cloud computing. That is, the game machine GM may be configured as a terminal which displays and provides results of processing of the control unit 30 though the network 3. Further, in the game system of the present invention, the center server 2 may be omitted and the game system may be realized by a single game machine.

The following describes one example of the present invention obtained from the above descriptions.

A game system as one aspect of the present invention is a game system which comprises a computer having a display device displaying a game screen including an indicative sign corresponding to an action timing when a play action should be executed and a reference sign corresponding to current time, wherein the computer, by executing a computer program, provides a game where the action timing is guided through the game screen by making relative displacement between the indicative sign and the reference sign occur along a pathway according to elapsed time so that a position of the indicative sign and a position of the reference sign coincide with each other at the action timing, wherein the computer by executing the computer program functions as: an area presenting device which is configured to present a game area in the game screen, the game area including a plurality of lane images which extends in parallel to each other so that a height difference is formed between at least one part of the plurality of lane images; and two types sign images disposed along each of the plurality of lane images; and a sign controlling device which is configured to control display of the two types sign images so that, by making the relative displacement between the two types sign images occur along each of the lane images, the two types sing images function as the indicative sign and the reference sign respectively, and each of the lane images functions as the pathway.

According to the present invention, the two types of sign images functioning the reference sign and the indicative sign respectively are disposed along each of the lane images, and each lane image functions as the time axis. Concretely, the action timing is guided through the relative displacement of the two images which occurs along each lane image. Due to this, the attention of a user is likely to focus on those two images. On the other hand, between the at least one part of the plurality of lane images, the height difference, that is, a difference with respect to the vertical direction is formed.

The game area may be configured by various embodiments. For example, as one embodiment of the game system of the present invention, the area presenting device may be configured to use a two-dimensional image as the game area, the two-dimensional image corresponding to a shooting result obtained when a virtual three-dimensional space is shot by a virtual camera, the virtual three-dimensional space including: a plurality of lanes corresponding to the plurality of lane images respectively; and two types of signs disposed on each of the plurality of lanes so as to correspond to the two types sign images respectively.

The plurality of lane images may be arranged in the game area in various embodiments. For example, the plurality of lane images may include a plurality of lane image groups, and at least two of the plurality of lane images constituting each of the lane image groups may be arranged so as to form a surface. In this embodiment, the plurality of lane image groups may be disposed so that the height difference is formed by the surface corresponding to each of the plurality of lane image groups, and the at least two of the plurality of lane images of each lane image group forming the height difference may function as the at least one part of the plurality of lane images. Further, in this embodiment, the plurality of lane image groups may include a first lane-image group to which three of the plurality of lane images belong and a second lane-image group to which two of the plurality of lane images belong, the first lane-image group may be disposed above the second lane-image group so that the three lane images are located at regular intervals, and each lane image belonging to the second lane-image group may be disposed at regular intervals so as to be located below an interval between the lane images belonging to the first lane-image group.

As the play action, a predetermined motion, or an operation to various operation portions may be employed. For example, in the embodiment that the game area includes the plurality of lane image groups, the game system may further comprise an input device having a plurality of operation portions, wherein operation to each of the plurality of operation portions may be employed as the play action, the plurality of operation portions may include a plurality of operation portion groups, each of the plurality of operation portion groups may include the operation portions same in number as the at least two lane images belonging to each lane image group, and be disposed so as to correspond to the height difference of the surface, and the operation portions of each operation portion group may be disposed in an arrangement corresponding to an arrangement of the lane images forming the surface.

As the action timing, various timing such as the operation timing or the motion timing may be employed. Similarly, various kinds of games may be provided. For example, in the embodiment where the input device having the plurality of operation portions, the game system may further comprise a data storing device which stores sequence data where an operation timing for each of the plurality of operation portions is described as the action timing, wherein the sign controlling device may be configured to control the display of the two types of sign images based on the action timing of the sequence data. In this embodiment, the game may be a music game where the play action is requested in conformity with rhythm of a tune, and in the sequence data, elapsed time from a start timing of the tune may be described as the operation timing.

In the embodiment where the music game is provided, in the game area, an interval sign dividing the elapsed time into a predetermined interval may be disposed so as to indicate a position corresponding to the predetermined interval of each of the plurality of lane images. In this embodiment, a connection line may be disposed so as to connect the lane images is employed as the interval sign.

Further, in the embodiment that the game area includes the plurality of lane image groups, the at least two lane images may be colored differently for each lane image group, and a sign image corresponding to the indicative sign group, within the two types of sign images, may be colored according to the lane image where the sign image is located. Especially, in a case that the relative displacement is represented stereoscopically, like a case that the relative displacement occurs from the deeper side to the nearer side, or the like, the plurality of lane images are collected visually to one lane image as going to the deeper side, thereby, the identification of each lane image is likely to become difficult. In a case that the height difference is formed between the lane images, it is necessary to change the line of sight vertically depending on which the lane image having a sign image belongs to the upper lane image group or the lower lane image group. Due to this, differently from a case that the lanes are arranged in a single surface, it is required to distinguish the lane image groups with respect to at least the vertical direction. On the other hand, in a case that sign images are colored differently from each other for each lane image, since too much information is provided, it could be difficult to distinguish the lane image to which each sign image belongs.

In the embodiment where the two-dimensional image corresponding to the virtual three-dimensional space is used as the game area, the area presenting device may be configured to use a two-dimensional image as the game area, the two-dimensional image corresponding to a shooting result where shooting condition with respect to the virtual camera has changed so that a state that each of the plurality of lane images extends changes depending on a specifying condition, the shooting condition including at least one of a shooting position, a shooting angle, and a field angle. In this case, the state that each lane image extends changes depending on the specifying condition in such a way as to correspond to the change of the shooting condition of the virtual camera.

In the embodiment where the state that each lane image extends changes depending on the specifying condition, a change of length of each of the plurality of lane images may be included in the state that each of the plurality of lane images extends, and the area presenting device may be configured to present the game area so that a distance of the relative displacement changes depending on the specifying condition.

As the direction where each lane image extends, various embodiments may be employed. For example, in the embodiment that the two-dimensional image corresponding to the virtual three-dimensional space is used as the game area, the area presenting device may be configured to use as the game area, the two-dimensional image corresponding to the shooting result obtained when the virtual three-dimensional space is shot so that each of the plurality of lane images extends from a deeper side to a nearer side of the game area.

In one embodiment of the game system as one aspect of the present invention, the area presenting device may be configured to present the game area so that a distance of the relative distance changes, in a case that a change condition is satisfied. In this case, when the change condition is satisfied, the distance of the relative displacement is changed.

Similarly, in on one embodiment of the game system as one aspect of the present invention, the area presenting device may be configured to present the game area so that the height difference between the at least one part of the plurality of lane images changes, in a case that a presentation condition is satisfied. In this embodiment, change by inverting the height difference between the at least one part of the plurality of lane images may be employed as the change of the height difference, and the area presenting device may be configured to invert the height difference between the at least one part of the plurality of lane images, in a case that the presentation condition is satisfied.

In one embodiment of the game system as one aspect of the present invention, a subsidiary sign may be displayed in the game area, the subsidiary sign being a notice indicating each of the action timings included in a predetermined time interval. In this embodiment, a subsidiary line may be employed as the subsidiary sign, the subsidiary line connecting sign images each of which is one type of the two types of images, the type of sign image guiding the action timing. For example, in a case that the relative displacement is represented stereoscopically, like a case that the relative displacement occurs from the deeper side to the nearer side or the like, the parallax could occur with respect to the vertical direction in relation to the height difference between the at least one part of the lane images. Further, the parallax with respect to the horizontal direction could occur even between the lane images located at the same height. In a case that change with respect to the horizontal direction occurs between the lane images, like a case that curved lane images are used or the like, the parallax with respect to the horizontal direction is more likely to occur. For example, with respect to the sign images corresponding to same action timing, though the positions thereof should be same, they sometimes look differently because of the parallax, and coincident timings when such sign images coincide with the reference signs respectively are the same.

As each lane image, various embodiments such as a straight line or a curved line may be employed. For example, as one embodiment of the game system as one aspect of the present invention, each of the plurality of lane images may have a change portion where a direction of the relative displacement is made to change in at least one part thereof. The shape of the change portion is not limited to a curved shape such as flexion. The change portion includes various embodiments there a displacement direction changes, such as a crank type.

The sign image corresponding to the reference sign may be disposed along each lane image in various shapes, such as a single curbed line connecting lane images (this line being shared by all lane images), or a straight line disposed for each lane image group (this line being shared by each lane image group). For example, in one embodiment of the game system as one aspect of the present invention, a sign image functioning as the reference sign within the two types of sign images may be disposed for each of the plurality of lane images so that the reference sign is located at each of the plurality of lane images.

Similarly, the relative displacement between two types of sign images may occur in various embodiments. For example, in one embodiment of the game system as one aspect of the present invention, the sign controlling device may be configured to control the two types of sign images, so that the relative displace occurs by move of the reference sign toward the indicative sign.

A non-transitory computer readable storage medium as one aspect of the present invention is a non-transitory computer readable storage medium storing the computer program of the game system as one aspect of the present invention.

What is claimed is:

1. A game system which comprises a computer having a display device displaying a game screen including an indicative sign corresponding to an action timing when a play action should be executed and a reference sign corresponding to current time, wherein the computer, by executing a computer program, provides a game where the action timing is guided through the game screen by making relative displacement between the indicative sign and the reference sign occur along a pathway according to elapsed time so that a position of the indicative sign and a position of the reference sign coincide with each other at the action timing, wherein
the computer by executing the computer program functions as:
an area presenting device which is configured to present a game area in the game screen, the game area including a plurality of lane images which extends in parallel to each other so that a height difference is formed between at least one part of the plurality of lane images; and two types sign images disposed along each of the plurality of lane images, by outputting signals to the display device; and
a sign controlling device which is configured to control display of the two types sign images so that, by making the relative displacement between the two types sign images occur along each of the lane images, the two types sign images function as the indicative sign and the reference sign respectively, and each of the lane images functions as the pathway, by outputting signals to the display device, and wherein
the plurality of lane images includes a plurality of lane image groups, and
at least two of the plurality of lane images constituting each of the lane image groups are arranged so as to form a surface, and
the plurality of lane image groups includes two lane image groups forming respectively two surfaces forming the height difference, and
at least two of lane images corresponding to the two lane image groups respectively function as the at least one part of the plurality of lane images.

2. The game system according to claim 1, wherein the area presenting device is configured to use a two-dimensional image as the game area, the two-dimensional image corresponding to a shooting result obtained when a virtual three-dimensional space is shot by a virtual camera, the virtual three-dimensional space including: a plurality of lanes corresponding to the plurality of lane images respectively; and two types of signs disposed on each of the plurality of lanes so as to correspond to the two types sign images respectively.

3. The game system according to claim 2, wherein the area presenting device is configured to use a two-dimensional image as the game area, the two-dimensional image corresponding to a shooting result where shooting condition with respect to the virtual camera has changed so that a state that each of the plurality of lane images extends changes depending on a specifying condition, the shooting condition including at least one of a shooting position, a shooting angle, and a field angle.

4. The game system according to claim 2, wherein the area presenting device is configured to use as the game area, the two-dimensional image corresponding to the shooting result obtained when the virtual three-dimensional space is shot so that each of the plurality of lane images extends from a deeper side to a nearer side of the game area.

5. The game system according to claim 1, wherein the plurality of lane image groups include a first lane-image group to which three of the plurality of lane images belong and a second lane-image group to which two of the plurality of lane images belong,
the first lane-image group is disposed above the second lane-image group so that the three lane images are located at regular intervals, and
each lane image belonging to the second lane-image group is disposed at regular intervals so as to be located below an interval between the lane images belonging to the first lane-image group.

6. The game system according to claim 1 further comprising an input device having a plurality of operation portions, wherein
operation to each of the plurality of operation portions is employed as the play action,
the plurality of operation portions include a plurality of operation portion groups,
each of the plurality of operation portion groups includes the operation portions same in number as the at least two lane images belonging to each lane image group, and is disposed so as to correspond to the height difference of the surface, and
the operation portions of each operation portion group are disposed in an arrangement corresponding to an arrangement of the lane images forming the surface.

7. The game system according to claim 6, further comprising
a data storing device which stores sequence data where an operation timing for each of the plurality of operation portions is described as the action timing, wherein
the sign controlling device is configured to control the display of the two types of sign images based on the action timing of the sequence data.

8. The game system according to claim 7, wherein the game is a music game where the play action is requested in conformity with rhythm of a tune, and
in the sequence data, elapsed time from a start timing of the tune is described as the operation timing.

9. The game system according to claim 8, wherein in the game area, an interval sign dividing the elapsed time into a predetermined interval is disposed so as to indicate a position corresponding to the predetermined interval of each of the plurality of lane images.

10. The game system according to claim 1, wherein the at least two lane images are colored differently for each lane image group, and
a sign image corresponding to the indicative sign within the two types of sign images, is colored according to the lane image where the sign image is located.

11. The game system according to claim 1, wherein the area presenting device is configured to present the game area so that a distance of the relative distance changes, in a case that a change condition is satisfied.

12. The game system according to claim 1, wherein the area presenting device is configured to present the game area so that the height difference between the at least one part of the plurality of lane images changes, in a case that a presentation condition is satisfied.

13. The game system according to claim 12, where change by inverting the height difference between the at least one part of the plurality of lane images is employed as the change of the height difference, and
the area presenting device is configured to invert the height difference between the at least one part of the plurality of lane images, in a case that the presentation condition is satisfied.

14. The game system according to claim 1, wherein a subsidiary sign is displayed in the game area, the subsidiary sign being a notice indicating each of the action timings included in a predetermined time interval.

15. The game system according to claim 1, wherein each of the plurality of lane images has a change portion where a direction of the relative displacement is made to change in at least one part thereof.

16. The game system according to claim 1, wherein a sign image functioning as the reference sign within the two types of sign images is disposed for each of the plurality of lane images so that the reference sign is located at each of the plurality of lane images.

17. The game system according to claim 1, wherein the sign controlling device is configured to control the two types of sign images, so that the relative displace occurs by move of the reference sign toward the indicative sign.

18. A non-transitory computer readable storage medium storing a computer program for a game system which comprises a computer having a display device displaying a game screen including an indicative sign corresponding to an action timing when a play action should be executed and a reference sign corresponding to current time, wherein the computer, by executing the computer program, provides a game where the action timing is guided through the game screen by making relative displacement between the indicative sign and the reference sign occur along a pathway according to elapsed time so that a position of the indicative sign and a position of the reference sign coincide with each other at the action timing, wherein
the computer program is configured so as to cause the computer to function as:
an area presenting device which is configured to present a game area in the game screen, the game area including a plurality of lane images which extends in parallel to each other so that a height difference is formed between at least one part of the plurality of lane images; and two types sign images disposed along each of the plurality of lane images, by outputting signals to the display device; and
a sign controlling device which is configured to control display of the two types sign images so that, by making the relative displacement between the two types sign images occur along each of the lane images, the two types sign images function as the indicative sign and the reference sign respectively, and each of the lane images functions as the pathway, by outputting signals to the display device, and wherein
the plurality of lane images includes a plurality of lane image groups, and
at least two of the plurality of lane images constituting each of the lane image groups are arranged so as to form a surface, and the plurality of lane image groups includes two lane image groups forming respectively two surfaces forming the height difference, and
at least two of lane images corresponding to the two lane image groups respectively function as the at least one part of the plurality of lane images.

* * * * *